(12) United States Patent
Zhou et al.

(10) Patent No.: US 11,751,125 B2
(45) Date of Patent: *Sep. 5, 2023

(54) INFORMATION TRANSMISSION METHOD, NETWORK DEVICE, AND USER EQUIPMENT

(71) Applicant: Huawei Technologies Co., Ltd., Shenzhen (CN)

(72) Inventors: Pei Zhou, Chengdu (CN); Yan Long, Chengdu (CN); Xiao Han, Shenzhen (CN); Yingpei Lin, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,102

(22) Filed: Apr. 14, 2022

(65) Prior Publication Data

US 2022/0312300 A1    Sep. 29, 2022

Related U.S. Application Data

(63) Continuation of application No. 17/005,037, filed on Aug. 27, 2020, now Pat. No. 11,310,722, which is a
(Continued)

(30) Foreign Application Priority Data

Jun. 3, 2016   (CN) .......................... 201610394650.8
Jun. 27, 2016  (CN) .......................... 201610482072.3

(51) Int. Cl.
*H04W 48/10*      (2009.01)
*H04B 7/06*       (2006.01)
(Continued)

(52) U.S. Cl.
CPC .......... *H04W 48/10* (2013.01); *H04B 7/0617* (2013.01); *H04B 7/0695* (2013.01);
(Continued)

(58) Field of Classification Search
None
See application file for complete search history.

(56) References Cited

U.S. PATENT DOCUMENTS 11,310,722 B2*   4/2022  Zhou ..................... H04L 5/0037
2010/0103045 A1  4/2010  Liu et al.
(Continued)

FOREIGN PATENT DOCUMENTS

CN   101939926 A   1/2011
CN   102177742 A   9/2011
(Continued)

OTHER PUBLICATIONS

Park et al., "Multi-Channel Operation in 11ay," IEEE802.11-16/0401, XP68105309A, Institute of Electrical and Electronics Engineers, New York, New York (Mar. 2016).
(Continued)

*Primary Examiner* — Diane L Lo
(74) *Attorney, Agent, or Firm* — Leydig, Voit & Mayer, Ltd.

(57) ABSTRACT

Embodiments of this application provide an information transmission method, a network device, and a user equipment. The method provided in this application includes: sending, by a network device, a broadcast frame that includes first duration information and second duration information that are of A-BFT (Association Beamforming Training); receiving a frame sent by a first user equipment in a timeslot randomly selected from a first time range; and receiving a frame sent by a second user equipment in a timeslot randomly selected from a second time range.
(Continued)

According to the embodiments of this application, beamforming training efficiency can be improved.

17 Claims, 21 Drawing Sheets

Related U.S. Application Data continuation of application No. 16/206,288, filed on Nov. 30, 2018, now Pat. No. 10,805,865, which is a continuation of application No. PCT/CN2017/082325, filed on Apr. 28, 2017.

(51) Int. Cl.
| | | |
|---|---|---|
| *H04L 5/00* | (2006.01) | |
| *H04W 16/28* | (2009.01) | |
| *H04W 74/08* | (2009.01) | |
| *H04W 48/12* | (2009.01) | |
| *H04W 84/12* | (2009.01) | |
| *H04W 72/0446* | (2023.01) | |

(52) U.S. Cl.
CPC ............ *H04L 5/005* (2013.01); *H04L 5/0037* (2013.01); *H04W 16/28* (2013.01); *H04W 72/0446* (2013.01); *H04W 74/0833* (2013.01); *H04W 48/12* (2013.01); *H04W 84/12* (2013.01)

(56) References Cited

U.S. PATENT DOCUMENTS

| | | |
|---|---|---|
| 2010/0254466 A1 | 10/2010 | Wang et al. |
| 2010/0265925 A1* | 10/2010 | Liu .................. H04W 72/0446 370/336 |
| 2011/0080898 A1 | 4/2011 | Cordeiro et al. |
| 2013/0021921 A1 | 1/2013 | He et al. |
| 2013/0083865 A1 | 4/2013 | Wu et al. |
| 2013/0170407 A1 | 7/2013 | Liang et al. |
| 2013/0329712 A1 | 12/2013 | Cordeiro et al. |
| 2014/0112317 A1 | 4/2014 | Liu et al. |
| 2014/0161105 A1 | 6/2014 | Cordeiro et al. |
| 2015/0139163 A1 | 5/2015 | Cordeiro et al. |
| 2016/0119043 A1 | 4/2016 | Rajagopal et al. |
| 2017/0064583 A1 | 3/2017 | Roy et al. |
| 2017/0086211 A1* | 3/2017 | Sahin .................... H04W 72/12 |
| 2017/0264350 A1 | 9/2017 | Sanderovich et al. |
| 2017/0265122 A1* | 9/2017 | Levy ..................... H04W 48/16 |
| 2018/0123665 A1 | 5/2018 | Oh et al. |
| 2019/0123798 A1 | 4/2019 | Lou et al. |
| 2020/0322014 A1* | 10/2020 | Jo ............................ H04B 7/06 |

FOREIGN PATENT DOCUMENTS

| | | |
|---|---|---|
| CN | 102396164 A | 3/2012 |
| CN | 102412881 A | 4/2012 |
| CN | 102595648 A | 7/2012 |
| CN | 104079334 A | 10/2014 |
| CN | 104219776 A | 12/2014 |
| CN | 104734759 A | 6/2015 |
| RU | 2496231 C1 | 10/2013 |
| WO | 2011134522 A1 | 11/2011 |
| WO | 2012041101 A1 | 4/2012 |
| WO | 2015138914 A1 | 9/2015 |

OTHER PUBLICATIONS

Xin et al., "Channel Access in A-BFT over Multiple Channels," IEEE802.11-16/0101r0, XP68104887A, Institute of Electrical and Electronics Engineers, New York, New York (Jan. 2016).

Lenovo,"HARQ-ACK codebook determination for Rel-13 eCA," 3GPP TSG RAN WG1 Meeting #82, R1-154503, Beijing, China, pp. 1-4, 3rd Generation Partnership Project—Valbonne, France (Aug. 24-28, 2015).

"IEEE Standard for Information technology—Telecommunications and information exchange between systems Local and metropolitan area networks—Specific requirements, Part 11: Wireless LAN Medium Access Conlrol(MAC) and Physical Layer (PHY) Specifications, Amendment 3: Enhancements for Very High Throughput in the 60 GHz Band," IEEE Std 802.11ad™—2012, pp. 1-628, Institute of Electrical and Electronics Engineers, New York, New York, (Dec. 28, 2012).

* cited by examiner

| Element identifier | Length | Start time | ATI duration |
|---|---|---|---|
| 1 | 1 | 4 | 2 |

Byte

FIG. 9

| Element identifier | Length | Allocation 1 | Allocation 2 | ... | Allocation n |
|---|---|---|---|---|---|
| 1 | 1 | 15 | 15 | ... | 15 |

Byte

| Allocation control | Beamforming control | Source association identifier | Destination association identifier | Allocation start | Allocation block duration | Number of blocks | Allocation block period |
|---|---|---|---|---|---|---|---|
| 2 | 2 | 1 | 1 | 4 | 2 | 1 | 2 |

Byte

FIG. 10

| Bit | B0 | B1 B2 B5 | B6 | B7 B9 B10 B13 | B14 |
|---|---|---|---|---|---|
| | Clustering control present | Discovery node | Next beacon frame | ATI present | A-BFT length | FSS | Is responder transmit sector sweep |
| | 1 | 1 | 4 | 1 | 3 | 4 | 1 |

| Bit | B15 | B18 B19 | B20 B26 B27 | B30 B31 | B36 B37 | B42 | B43 B44 | B47 |
|---|---|---|---|---|---|---|---|---|
| | Next A-BFT | Fragmented transmit sector sweep | Transmit sector sweep span | N BIs A-BFT | A-BFT count | N A-BFT in an antenna interface | Basic service set control point association ready | Reserved |
| | 4 | 1 | 7 | 4 | 6 | 6 | 1 | 4 |

FIG. 11

INFORMATION TRANSMISSION METHOD, NETWORK DEVICE, AND USER EQUIPMENT

CROSS-REFERENCE TO RELATED APPLICATIONS

This application is a continuation of U.S. patent application Ser. No. 17/005,037, filed on Aug. 27, 2020, which is a continuation of U.S. patent application Ser. No. 16/206,288, filed on Nov. 30, 2018 (now U.S. Pat. No. 10,805,865), which is a continuation of International Application No. PCT/CN2017/082325, filed on Apr. 28, 2017, which claims priority to Chinese Patent Application No. 201610482072.3, filed on Jun. 27, 2016, and Chinese Patent Application No. 201610394650.8, filed on Jun. 3, 2016. All of the aforementioned patent applications are hereby incorporated by reference in their entireties.

TECHNICAL FIELD

Embodiments of this application relate to communications technologies, and in particular, to an information transmission method, a network device, and a user equipment.

BACKGROUND

Currently, a wireless local area network (WLAN) usually operates in 2.4 GHz and 5 GHz frequency bands. Spectrum resources on the frequency bands become extremely crowded as a quantity of devices that use the frequency bands increases. However, a 60 GHz millimeter wave band has a large quantity of available spectrum resources. Therefore, the 60 GHz frequency band will be widely used in the future. Because a path loss of the 60 GHz millimeter wave band is extremely large, a communication distance based on the 60 GHz millimeter wave band is usually relatively short. To increase the communication distance, by using a directional communications technology of beamforming (BF), a transmit signal of a transmit antenna may center on an extremely small narrow beam, and a receive antenna receives the signal in an extremely narrow beam range. Before a BF technology is used, a network device may send a directional multi-gigabit (DMG) beacon frame in a beacon transmission interval (BTI) within a beacon interval (BI). The DMG beacon frame may include duration of association beamforming training (A-BFT) in the BI. Each user equipment in at least one user equipment that receives the DMG beacon frame sends a sector sweep (SSW) frame to the network device in a timeslot randomly selected in the duration of the A-BFT, so as to implement beamforming training of the user equipment.

With continuous development of communications technologies, a quantity and a type of user equipment continuously increase. However, currently, a network device may implement beamforming training of user equipment of one type in same A-BFT. This results in relatively low efficiency of beamforming training of the user equipment.

SUMMARY

Embodiments of this application provide an information transmission method, a network device, and a user equipment, so as to improve beamforming training efficiency.

According to an aspect, an embodiment of this application provides an information transmission method, including:

sending, by a network device, a broadcast frame, where the broadcast frame includes first duration information and second duration information that are of association beamforming training A-BFT; the first duration information is used by a first user equipment to determine a first time range, so that the first user equipment randomly selects a timeslot from the first time range; and the second duration information is used by a second user equipment to determine a second time range, so that the second user equipment randomly selects a timeslot from the second time range;

receiving, by the network device, a first-type frame sent by the first user equipment in the timeslot randomly selected from the first time range; and receiving, by the network device, a second-type frame sent by the second user equipment in the timeslot randomly selected from the second time range.

According to the information transmission method, the network device may implement beamforming training of user equipments of multiple access types in same A-BFT, so as to improve beamforming training efficiency and improve a network throughput.

Optionally, the first duration information includes duration of the first time range; and the duration of the first time range is used by the first user equipment to determine an end time of the first time range according to a preset start time and the duration of the first time range, and determine the first time range according to the preset start time and the end time of the first time range.

Optionally, the second duration information includes duration of the second time range;

the duration of the first time range is further used by the second user equipment to determine a start time of the second time range according to the duration of the first time range; and the duration of the second time range is used by the second user equipment to determine an end time of the second time range according to the start time of the second time range and the duration of the second time range, and determine the second time range according to the start time of the second time range and the end time of the second time range.

Optionally, the second duration information includes duration of the second time range; and the duration of the second time range is used by the second user equipment to determine an end time of the second time range according to the preset start time and the duration of the second time range, and determine the second time range according to the preset start time and the end time of the second time range.

In the information transmission method, both a start time of the first time range and the start time of the second time range may be the preset start time. Therefore, the first time range and the second time range may have a partially-overlapped time, and the duration of the second time range may be greater than the duration of the first time range, so that a time selection range of the second user equipment is greater than a time selection range of the first user equipment, thereby effectively avoiding an access timeslot conflict of the second user equipment, and improving timeslot resource utilization.

Optionally, the duration of the first time range is located in an A-BFT length field of a beacon interval BI control field in the broadcast frame; and the duration of the second time range is located in any one of the following locations in the broadcast frame:

at least one bit in the BI control field except the A-BFT length field; or a preset field or information element in a data payload field, where the preset field or information element includes at least one bit.

Optionally, the broadcast frame further includes frame type indication information, and the frame type indication information is used by the second user equipment to determine a frame type; and the receiving, by the network device, a second-type frame sent by the second user equipment in the timeslot randomly selected from the second time range includes:

receiving, by the network device, the second-type frame that is corresponding to the frame type and sent by the second user equipment in the timeslot randomly selected from the second time range, where transmission duration of frames corresponding to different frame types is different.

Optionally, the frame type indication information is located in at least one reserved bit in a directional multi-gigabit DMG parameters field in the broadcast frame.

Optionally, the broadcast frame further includes frame quantity indication information, and the frame quantity indication information is used by the second user equipment to determine a frame quantity; and the receiving, by the network device, a second-type frame sent by the second user equipment in the timeslot randomly selected from the second time range includes:

receiving, by the network device, the frame quantity of the second-type frames successively sent by the second user equipment in the timeslot randomly selected from the second time range.

Optionally, the broadcast frame further includes usage indication information of at least one channel, and the usage indication information of the at least one channel is used by the second user equipment to determine whether the at least one channel is available, so that the second user equipment selects an available channel from the at least one channel; and the receiving, by the network device, a second-type frame sent by the second user equipment in the timeslot randomly selected from the second time range includes:

receiving, by the network device, the second-type frame sent by the second user equipment through the available channel in the timeslot randomly selected from the second time range.

Optionally, the receiving, by the network device, the second-type frame sent by the second user equipment through the available channel in the timeslot randomly selected from the second time range includes:

if the available channel is a main channel, receiving, by the network device, the second-type frame sent by the second user equipment through the available channel in the timeslot randomly selected from the second time range.

Optionally, the broadcast frame further includes duration information corresponding to each channel, and the duration information corresponding to each channel is used by the second user equipment to determine a time range corresponding to each channel, so that if the available channel is a secondary channel, the second user equipment randomly selects a timeslot from a time range corresponding to the available channel; and the method may further include:

receiving, by the network device, the second-type frame sent by the second user equipment through the available channel in the timeslot randomly selected from the time range corresponding to the available channel.

Optionally, the usage indication information of the at least one channel and/or the duration information corresponding to each channel are/is located in any one of the following locations in the broadcast frame:

at least one reserved bit of a DMG operation information field in a DMG operation element; or a preset field or information element in a data payload field, where the preset field or information element includes at least one bit.

Optionally, the second duration information is specifically used by the second user equipment to determine the second time range, so that the second user equipment randomly selects a timeslot from the second time range, and randomly selects backoff duration in the randomly selected timeslot; and the receiving, by the network device, a second-type frame sent by the second user equipment in the timeslot randomly selected from the second time range includes:

receiving, by the network device, the second-type frame sent by the second user equipment after the backoff duration in the timeslot randomly selected from the second time range.

According to the information transmission method, after randomly selecting the timeslot from the second time range, the second user equipment may further select the backoff duration, and send the second-type frame after the backoff duration, so as to effectively reduce a timeslot conflict between second user equipments and improve training efficiency of the A-BFT.

Optionally, backoff duration is determined by the second user equipment according to an access priority corresponding to the second user equipment, a higher access priority corresponding to the second user equipment indicates shorter backoff duration, and a lower access priority corresponding to the second user equipment indicates longer backoff duration.

Optionally, a larger quantity of access failures of the second user equipment indicates a higher access priority corresponding to the second user equipment.

According to the information transmission method, in a dense scenario, a timeslot conflict that occurs during an A-BFT period when multiple user equipments perform beamforming training may be reduced, so that user equipment that still cannot perform access after multiple training periods quickly accesses the network device, to quickly complete beamforming training, thereby improving training timeliness, and improving user experience.

Optionally, before the sending, by a network device, a frame, the method further includes:

determining, by the network device, whether a quantity of to-be-accessed user equipments is greater than a preset quantity value; and the sending, by a network device, a broadcast frame includes:

sending, by the network device, the broadcast frame if the quantity of user equipments is greater than or equal to the preset quantity value.

Optionally, the broadcast frame includes overload indicator information, and the overload indicator information is located in any one of the following locations:

a reserved bit of a beacon interval BI control field in a frame control field; or a reserved bit of another field other than the BI control field.

According to another aspect, an embodiment of this application further provides an information transmission method, including:

receiving, by a second user equipment, a broadcast frame sent by a network device, where the broadcast frame includes first duration information and second duration information that are of association beamforming training A-BFT, and the first duration information is used by a first user equipment to determine a first time range, so that the first user equipment randomly selects a timeslot from the first time range, so as to send a first-type frame to the network device in the timeslot randomly selected from the first time range;

determining, by the second user equipment, a second time range according to the second duration information, and randomly selecting a timeslot from the second time range; and sending, by the second user equipment, a second-type frame to the network device in the timeslot randomly selected from the second time range.

Optionally, the first duration information includes duration of the first time range, and the second duration information includes duration of the second time range; and the determining, by the second user equipment, a second time range according to the second duration information includes:

determining, by the second user equipment, a start time of the second time range according to the duration of the first time range;

determining, by the second user equipment, an end time of the second time range according to the start time of the second time range and the duration of the second time range; and determining, by the second user equipment, the second time range according to the start time of the second time range and the end time of the second time range.

Optionally, the second duration information includes duration of the second time range; and the determining, by the second user equipment, a second time range according to the second duration information includes:

determining, by the second user equipment, an end time of the second time range according to a preset start time and the duration of the second time range, where the preset start time is a preset start time of the first time range; and determining, by the second user equipment, the second time range according to the preset start time and the end time of the second time range.

Optionally, the duration of the first time range is located in an A-BFT length field of a beacon interval BI control field in the broadcast frame; and the duration of the second time range is located in any one of the following locations in the broadcast frame:

at least one reserved bit in the BI control field except the A-BFT length field; or a preset field or information element in a data payload field, where the preset field or information element includes at least one bit.

Optionally, the broadcast frame further includes frame type indication information;

before the sending, by the second user equipment, a second-type frame to the network device in the timeslot randomly selected from the second time range, the method may further include:

determining, by the second user equipment, a frame type according to the frame type indication information; and the sending, by the second user equipment, a second-type frame to the network device in the timeslot randomly selected from the second time range includes:

sending, by the second user equipment to the network device in the timeslot randomly selected from the second time range, the second-type frame corresponding to the frame type, where transmission duration of frames corresponding to different frame types is different.

Optionally, the frame type indication information is located in at least one reserved bit in a directional multi-gigabit DMG parameters field in the broadcast frame.

Optionally, the broadcast frame further includes frame quantity indication information;

before the sending, by the second user equipment, a second-type frame to the network device in the timeslot randomly selected from the second time range, the method further includes:

determining, by the second user equipment, a quantity of to-be-sent frames according to the frame quantity indication information; and the sending, by the second user equipment, a second-type frame to the network device in the timeslot randomly selected from the second time range includes:

successively sending, by the second user equipment, the frame quantity of the second-type frames to the network device in the timeslot randomly selected from the second time range.

Optionally, the broadcast frame further includes usage indication information of at least one channel; and the sending, by the second user equipment, a second-type frame to the network device in the timeslot randomly selected from the second time range includes:

determining, by the second user equipment according to the usage indication information of the at least one channel, whether the at least one channel is available; and selecting an available channel from the at least one channel; and sending, by the second user equipment, the second-type frame to the network device through the available channel in the timeslot randomly selected from the second time range.

Optionally, the sending, by the second user equipment, the second-type frame to the network device through the available channel in the timeslot randomly selected from the second time range includes:

if the available channel is a main channel, sending, by the second user equipment, the second-type frame to the network device through the available channel in the timeslot randomly selected from the second time range.

Optionally, the broadcast frame further includes duration information corresponding to each channel; and the method further includes:

if the available channel is a secondary channel, determining, by the second user equipment according to duration information corresponding to the available channel, a time range corresponding to the available channel;

randomly selecting, by the second user equipment, a timeslot from the time range corresponding to the available channel; and sending, by the second user equipment, the second-type frame through the available channel in the timeslot randomly selected from the time range corresponding to the available channel.

Optionally, the usage indication information of the at least one channel and/or the duration information corresponding to each channel are/is located in any one of the following locations in the broadcast frame:

at least one reserved bit of a DMG operation information field in a DMG operation element; or a preset field or information element in a data payload field, where the preset field or information element includes at least one bit.

Optionally, before the sending, by the second user equipment, a second-type frame to the network device in the timeslot randomly selected from the second time range includes:

randomly selecting, by the second user equipment, backoff duration in the timeslot randomly selected from the second time range; and the sending, by the second user equipment, a second-type frame to the network device in the timeslot randomly selected from the second time range includes:

sending, by the second user equipment, the second-type frame to the network device after the backoff duration in the timeslot randomly selected from the second time range.

Optionally, before the sending, by the second user equipment, a second-type frame to the network device in the timeslot randomly selected from the second time range, the method further includes:

determining, by the second user equipment according to an access priority of the second user equipment, backoff duration corresponding to the access priority, where a higher access priority indicates shorter backoff duration, and a lower access priority indicates longer backoff duration; and the sending, by the second user equipment, a second-type frame to the network device in the timeslot randomly selected from the second time range includes:

sending, by the second user equipment, the second-type frame to the network device after the backoff duration in the timeslot randomly selected from the second time range.

Optionally, before the determining, by the second user equipment according to an access priority of the second user equipment, backoff duration corresponding to the access priority, the method further includes:

determining, by the second user equipment, the access priority according to a quantity of access failures of the second user equipment, where a larger quantity of access failures indicates a higher access priority.

According to still another aspect, an embodiment of this application provides a network device, including a transmitter and a receiver, where the transmitter is configured to send a broadcast frame, where the broadcast frame includes first duration information and second duration information that are of association beamforming training A-BFT; the first duration information is used by a first user equipment to determine a first time range, so that the first user equipment randomly selects a timeslot from the first time range; and the second duration information is used by a second user equipment to determine a second time range, so that the second user equipment randomly selects a timeslot from the second time range; and the receiver is configured to: receive a first-type frame sent by the first user equipment in the timeslot randomly selected from the first time range; and receive a second-type frame sent by the second user equipment in the timeslot randomly selected from the second time range.

Optionally, the first duration information includes duration of the first time range; and the duration of the first time range is used by the first user equipment to determine an end time of the first time range according to a preset start time and the duration of the first time range, and determine the first time range according to the preset start time and the end time of the first time range.

Optionally, the second duration information includes duration of the second time range;

the duration of the first time range is further used by the second user equipment to determine a start time of the second time range according to the duration of the first time range; and the duration of the second time range is used by the second user equipment to determine an end time of the second time range according to the start time of the second time range and the duration of the second time range, and determine the second time range according to the start time of the second time range and the end time of the second time range.

Optionally, the second duration information includes duration of the second time range; and the duration of the second time range is used by the second user equipment to determine an end time of the second time range according to the preset start time and the duration of the second time range, and determine the second time range according to the preset start time and the end time of the second time range.

Optionally, the broadcast frame further includes frame type indication information, and the frame type indication information is used by the second user equipment to determine a frame type; and the receiver is specifically configured to receive the second-type frame that is corresponding to the frame type and sent by the second user equipment in the timeslot randomly selected from the second time range, where transmission duration of frames corresponding to different frame types is different.

Optionally, the broadcast frame further includes frame quantity indication information, and the frame quantity indication information is used by the second user equipment to determine a frame quantity; and the receiver is specifically configured to receive the frame quantity of the second-type frames successively sent by the second user equipment in the timeslot randomly selected from the second time range.

Optionally, the broadcast frame further includes usage indication information of at least one channel, and the usage indication information of the at least one channel is used by the second user equipment to determine whether the at least one channel is available, so that the second user equipment selects an available channel from the at least one channel; and the receiver is further specifically configured to receive the second-type frame sent by the second user equipment through the available channel in the timeslot randomly selected from the second time range.

Optionally, the receiver is further specifically configured to: if the available channel is a main channel, receive the second-type frame sent by the second user equipment through the available channel in the timeslot randomly selected from the second time range.

Optionally, the broadcast frame further includes duration information corresponding to each channel, and the duration information corresponding to each channel is used by the second user equipment to determine a time range corresponding to each channel, so that if the available channel is a secondary channel, the second user equipment randomly selects a timeslot from a time range corresponding to the available channel; and the receiver is further configured to receive the second-type frame sent by the second user equipment through the available channel in the timeslot randomly selected from the time range corresponding to the available channel.

Optionally, the second duration information is specifically used by the second user equipment to determine the second time range, so that the second user equipment randomly selects a timeslot from the second time range, and randomly selects backoff duration in the randomly selected timeslot; and the receiver is specifically configured to receive the second-type frame sent by the second user equipment after the backoff duration in the timeslot randomly selected from the second time range.

Optionally, backoff duration is determined by the second user equipment according to an access priority corresponding to the second user equipment, a higher access priority corresponding to the second user equipment indicates shorter backoff duration, and a lower access priority corresponding to the second user equipment indicates longer backoff duration.

Optionally, a larger quantity of access failures of the second user equipment indicates a higher access priority corresponding to the second user equipment.

According to yet another aspect, an embodiment of this application may further provide user equipment, where the user equipment is second user equipment, and includes a receiver, a processor, and a transmitter, the receiver is connected to the processor, and the processor is connected to the transmitter, where the receiver is configured to receive a broadcast frame sent by a network device, where the broadcast frame includes first duration information and second duration information that are of association beamforming training A-BFT, and the first duration information is used by a first user equipment to determine a first time range, so that the first user equipment randomly selects a timeslot from the first time range, so as to send a first-type frame to the network device in the timeslot randomly selected from the first time range;

the processor is configured to determine a second time range according to the second duration information, and randomly select a timeslot from the second time range; and the transmitter is configured to send a second-type frame to the network device in the timeslot randomly selected from the second time range.

Optionally, the first duration information includes duration of the first time range, and the second duration information includes duration of the second time range; and the processor is specifically configured to: determine a start time of the second time range according to the duration of the first time range; determine an end time of the second time range according to the start time of the second time range and the duration of the second time range; and determine the second time range according to the start time of the second time range and the end time of the second time range.

Optionally, the second duration information includes duration of the second time range; and the processor is further specifically configured to: determine an end time of the second time range according to a preset start time and the duration of the second time range, where the preset start time is a preset start time of the first time range; and determine the second time range according to the preset start time and the end time of the second time range.

Optionally, the broadcast frame further includes frame type indication information;

the processor is further configured to determine a frame type according to the frame type indication information before the transmitter sends the second-type frame to the network device in the timeslot randomly selected from the second time range; and the transmitter is specifically configured to send, to the network device in the timeslot randomly selected from the second time range, the second-type frame corresponding to the frame type, where transmission duration of frames corresponding to different frame types is different.

Optionally, the broadcast frame further includes frame quantity indication information;

the processor is further configured to determine a quantity of to-be-sent frames according to the frame quantity indication information before the transmitter sends the second-type frame to the network device in the timeslot randomly selected from the second time range; and the transmitter is specifically configured to successively send the frame quantity of the second-type frames to the network device in the timeslot randomly selected from the second time range.

Optionally, the broadcast frame further includes usage indication information of at least one channel;

the processor is further configured to determine, according to the usage indication information of the at least one channel, whether the at least one channel is available; and select an available channel from the at least one channel; and the transmitter is specifically configured to send the second-type frame to the network device through the available channel in the timeslot randomly selected from the second time range.

Optionally, the transmitter is specifically configured to: if the available channel is a main channel, send the second-type frame to the network device through the available channel in the timeslot randomly selected from the second time range.

Optionally, the broadcast frame further includes duration information corresponding to each channel;

the processor is further configured to: if the available channel is a secondary channel, determine, according to duration information corresponding to the available channel, a time range corresponding to the available channel; and randomly select a timeslot from the time range corresponding to the available channel; and the transmitter is further configured to send the second-type frame through the available channel in the timeslot randomly selected from the time range corresponding to the available channel.

Optionally, the processor is further configured to: before the transmitter sends the second-type frame to the network device in the timeslot randomly selected from the second time range, randomly select backoff duration in the timeslot randomly selected from the second time range; and the transmitter is specifically configured to send the second-type frame to the network device after the backoff duration in the timeslot randomly selected from the second time range.

Optionally, the processor is further configured to: before the transmitter sends the second-type frame to the network device in the timeslot randomly selected from the second time range, determine, according to an access priority of the second user equipment, backoff duration corresponding to the access priority, where a higher access priority indicates shorter backoff duration, and a lower access priority indicates longer backoff duration; and the transmitter is specifically configured to send the second-type frame to the network device after the backoff duration in the timeslot randomly selected from the second time range.

Optionally, the processor is further configured to determine the access priority according to a quantity of access failures of the second user equipment, where a larger quantity of access failures indicates a higher access priority.

According to the information transmission method, the network device, and the user equipment that are provided in the embodiments of this application, the network device sends the broadcast frame that includes the first duration information and the second duration information that are of the A-BFT, so that the first user equipment can determine the first time range according to the first duration information, and randomly select the timeslot from the first time range, so as to send the first-type frame in the timeslot randomly selected from the first time range; and the second user equipment can determine the second time range according to the second duration information, and randomly select the timeslot from the second time range, so as to send the second-type frame in the timeslot randomly selected from the second time range. Therefore, the network device may implement beamforming training of the first user equipment and the second user equipment in the same A-BFT, so as to improve beamforming training efficiency and improve a network throughput.

BRIEF DESCRIPTION OF DRAWINGS

FIG. 9 is a schematic structural diagram of a next DMG ATI element according to Embodiment 2 of this application;

FIG. 10 is a schematic structural diagram of an extended schedule element according to Embodiment 2 of this application;

FIG. 11 is a schematic structural diagram of a BI control field according to Embodiment 2 of this application;

DESCRIPTION OF EMBODIMENTS

Figure 1:
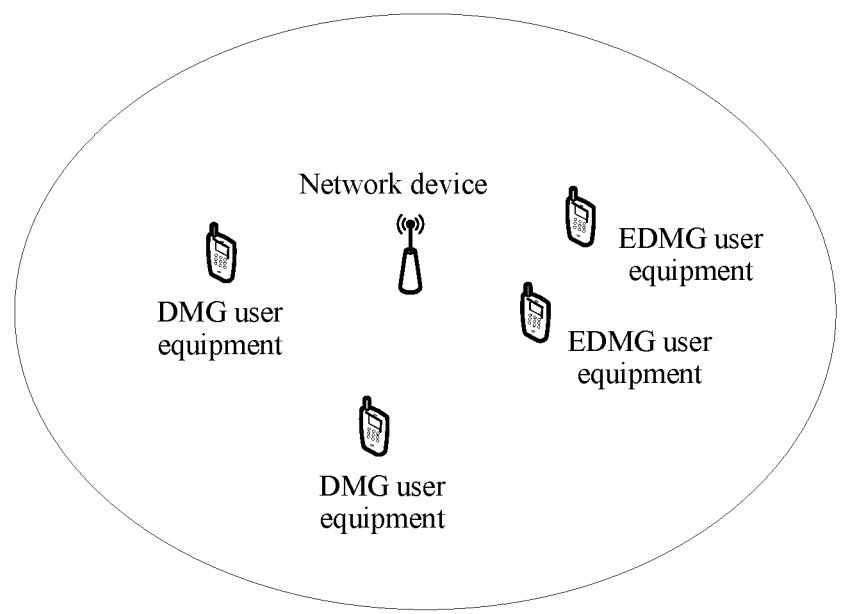
FIG. 1 is a schematic structural diagram of a network system applicable to embodiments of this application.

An information transmission method, a network device, and user equipment that are provided in embodiments of this application are applicable to a WLAN system, and in particular, to a WLAN system in the 802.11ad standard, that in the 802.11ay standard, and those in follow-up improved standards of the 802.11ad standard and the 802.11ay standard. The information transmission method is applicable to a network scenario with user equipments of multiple access types. FIG. 1 is a schematic structural diagram of a network system applicable to the embodiments of this application. As shown in FIG. 1, the network system to which the information transmission method is applicable may include, for example, a network device, at least one directional multi-gigabit (DMG) user equipment, and at least one enhanced directional multi-gigabit (EDMG) user equipment. The DMG user equipment and the EDMG user equipment in FIG. 1 each may be user equipment of an access type. The network device may be, for example, a personal basic service set control point (PCP)/access point (AP). The user equipment may be a station (STA). The DMG user equipment in FIG. 1 may be a DMG station, that is, a station corresponding to the 802.11ad standard, and the EDMG user equipment may be an EDMG station, that is, a station corresponding to the 802.11 ay standard.

By performing the information transmission method provided in this application, the network device may send a frame that includes multiple pieces of duration information of A-BFT, so that each of the user equipments of multiple access types can determine a duration range according to duration information corresponding to the user equipment of an access type, randomly select a timeslot from the duration range, and send a corresponding frame to the network device in the randomly selected timeslot. Therefore, the network device may implement beamforming training of the user equipments of multiple access types in the same A-BFT, so as to improve beamforming training efficiency and improve a network throughput. User equipments of different access types may be user equipments in different communications standards. It should be noted that the following methods in this application may be illustrated by using a solution in which two pieces of duration information are included. However, this is not limited in this application.

Figure 2:
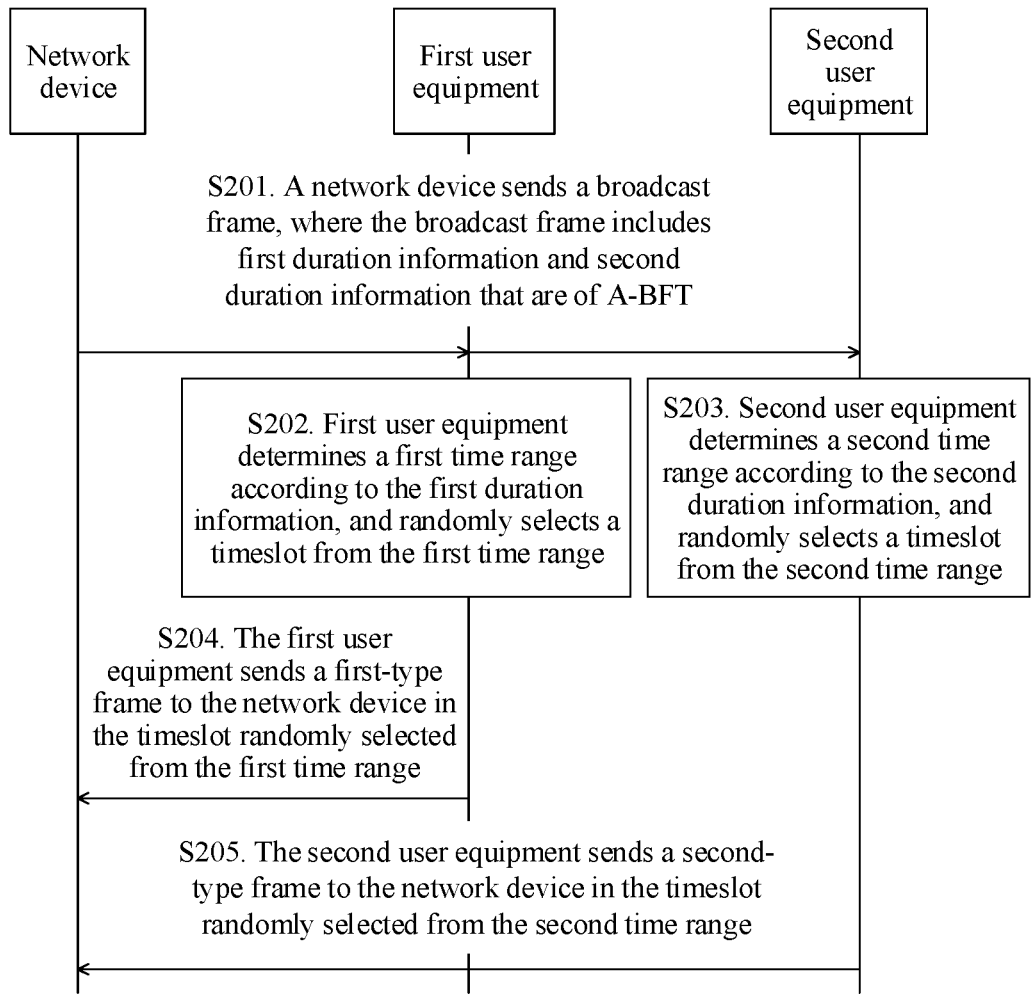
FIG. 2 is a flowchart of an information transmission method according to Embodiment 1 of this application.

Embodiment 1 of this application provides an information transmission method. FIG. 2 is a flowchart of the information transmission method according to Embodiment 1 of this application. As shown in FIG. 2, the method may include the following steps.

S201. A network device sends a broadcast frame, where the broadcast frame includes first duration information and second duration information that are of A-BFT.

The first duration information is used by a first user equipment to determine a first time range, so that the first user equipment randomly selects a timeslot from the first time range. The second duration information is used by a second user equipment to determine a second time range, so that the second user equipment randomly selects a timeslot from the second time range.

The broadcast frame may be, for example, a beacon frame. The network device may send the broadcast frame, for example, in a broadcast or multicast manner, so that multiple user equipments that include the first user equipment and the second user equipment receive the broadcast frame.

The first user equipment and the second user equipment may be respectively user equipments of different access types, such as user equipments in different communications standards. The first user equipment may be, for example, a station corresponding to the 802.11ad standard that is also referred to as a DMG station. The second user equipment may be, for example, a station corresponding to the 802.11ay standard that may also be referred to as an EDMG station.

S202. First user equipment determines a first time range according to the first duration information, and randomly selects a timeslot from the first time range.

If the first user equipment is a DMG station, the first duration information may be DMG duration information, and the first time range may be a DMG time range. The first user equipment randomly selects the timeslot from the first time range. Therefore, the first time range may also be referred to as a contention range of the DMG station.

S203. Second user equipment determines a second time range according to the second duration information, and randomly selects a timeslot from the second time range.

If the second user equipment is an EDMG station, the second duration information may be EDMG duration information, and the second time range may be an EDMG time range. The second user equipment randomly selects the timeslot from the second time range. Therefore, the second time range may also be referred to as a contention range of the EDMG station.

Both the first duration information and the second duration information are duration information of the A-BFT. Therefore, the first time range and the second time range may be two time ranges of the A-BFT. In the A-BFT, the first time range and the second time range may have no overlapped time, or may have a partially-overlapped time. This is not limited in this application.

S204. The first user equipment sends a first-type frame to the network device in the timeslot randomly selected from the first time range.

In the timeslot randomly selected from the first time range, the first user equipment may further receive a feedback frame that is corresponding to the first-type frame and sent by the network device after receiving the first-type frame. The first-type frame may be, for example, an SSW frame. The first user equipment sends the first-type frame to the network device in the timeslot randomly selected from the first time range, so that the network device may implement beamforming training of the first user equipment in the first time range of the A-BFT.

S205. The second user equipment sends a second-type frame to the network device in the timeslot randomly selected from the second time range.

In the timeslot randomly selected from the second time range, the second user equipment may further receive a feedback frame that is corresponding to the second-type frame and sent by the network device after receiving the second-type frame. The first-type frame may be of a same type as the second-type frame. The second-type frame may be, for example, an SSW frame, or may be a frame of another type. The second user equipment sends the second-type frame to the network device in the timeslot randomly selected from the second time range, so that the network device may implement beamforming training of the second user equipment in the second time range of the A-BFT. It can be learned from the above that, according to the information transmission method described in Embodiment 1 of this application, the network device may implement beamforming training of user equipments of multiple access types in same A-BFT, so as to improve beamforming training efficiency and improve a network throughput.

It should be noted that, there is no absolute sequence between S202 and S203, and S202 and S203 may be successively performed, or may be simultaneously performed. There is no absolute sequence between S204 and S205, and S204 and S205 may be successively performed, or may be simultaneously performed. This is not limited in this application.

According to the information transmission method provided in Embodiment 1 of this application, the network device sends the broadcast frame that includes the first duration information and the second duration information that are of the A-BFT, so that the first user equipment can determine the first time range according to the first duration information, and randomly select the timeslot from the first time range, so as to send the first-type frame in the timeslot randomly selected from the first time range; and the second user equipment can determine the second time range according to the second duration information, and randomly select the timeslot from the second time range, so as to send the second-type frame in the timeslot randomly selected from the second time range. Therefore, the network device may implement beamforming training of the user equipments of multiple access types in the same A-BFT, so as to improve the beamforming training efficiency and improve the network throughput.

Figure 3:
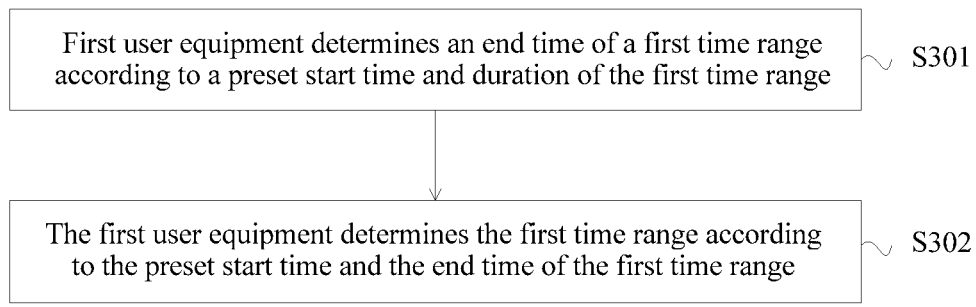
FIG. 3 is a flowchart in which first user equipment determines a first time range in an information transmission method according to Embodiment 2 of this application.

Optionally, the first duration information may include duration of the first time range. Embodiment 2 of this application further provides an information transmission method. FIG. 3 is a flowchart in which first user equipment determines a first time range in the information transmission method according to Embodiment 2 of this application. As shown in FIG. 3, in the information transmission method, S202 in which first user equipment determines a first time range according to the first duration information may include the following steps:

S301. The first user equipment determines an end time of the first time range according to a preset start time and the duration of the first time range.

S302. The first user equipment determines the first time range according to the preset start time and the end time of the first time range.

Specifically, the first user equipment may determine the end time of the first time range according to a sum of the preset start time and the duration of the first time range. After a start time and the end time that are of the first time range are determined, the first time range is determined. The first time range is a time period from the start time of the first time range to the end time of the first time range.

Figure 4:
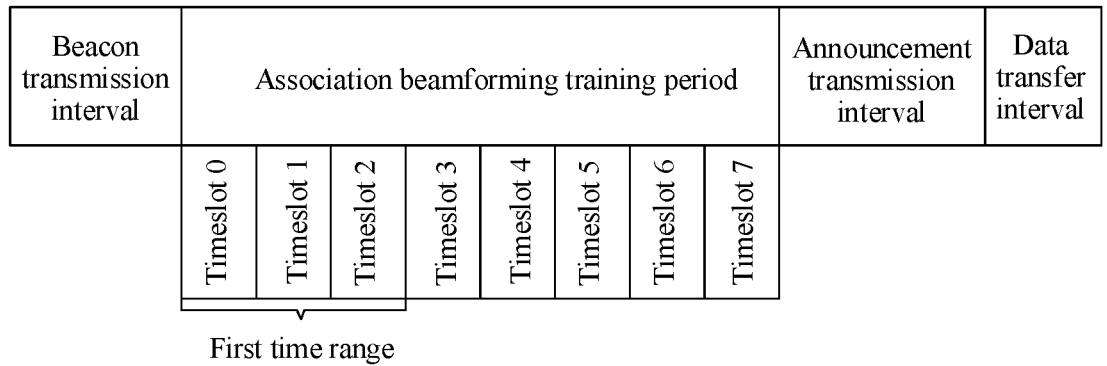
FIG. 4 is a schematic structural diagram of a BI according to Embodiment 2 of this application.

For example, FIG. 4 is a schematic structural diagram of a BI according to Embodiment 2 of this application. As shown in FIG. 4, the BI may include a beacon transmission interval (BTI), an A-BFT period, an announcement transmission interval (ATI), and a data transfer interval (DTI). If the A-BFT period includes eight timeslots, and the preset start time is 0, the start time of the first time range is a timeslot 0 in the A-BFT period. If the duration of the first time range is 2, the end time of the first time range may be a timeslot 2 in the A-BFT period. In this case, the first time range may be three timeslots from the timeslot 0 to the timeslot 2 shown in FIG. 4, and may be represented as [timeslot 0, timeslot 2].

Figure 5:
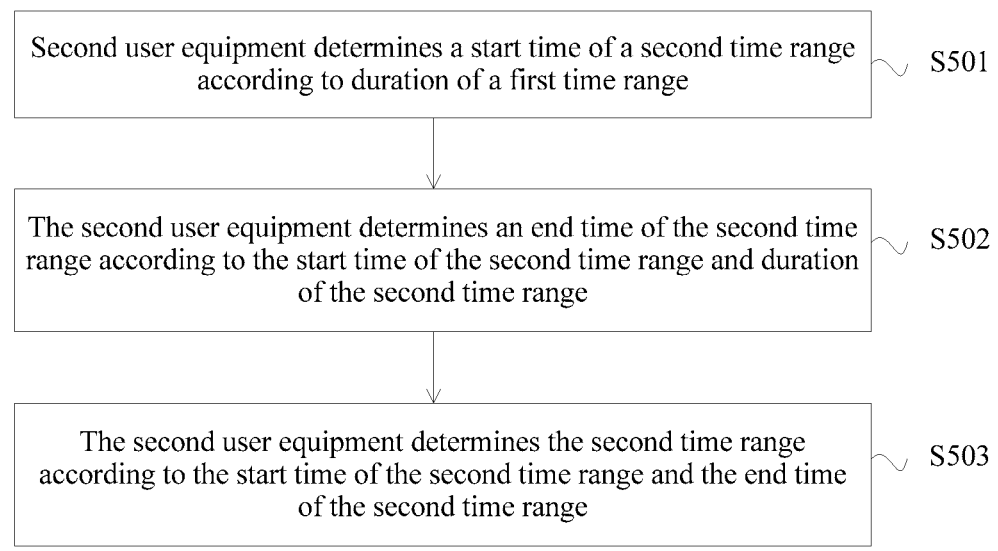
FIG. 5 is a flowchart in which second user equipment determines a second time range in an information transmission method according to Embodiment 2 of this application.

Optionally, the second duration information may include duration of the second time range. Embodiment 2 of this application further provides an information transmission method. FIG. 5 is a flowchart in which second user equipment determines a second time range in the information transmission method according to Embodiment 2 of this application. As shown in FIG. 5, S203 in which second user equipment determines a second time range according to the second duration information may include the following steps.

S501. The second user equipment determines a start time of the second time range according to the duration of the first time range.

Specifically, the second user equipment may determine the end time of the first time range according to the duration of the first time range and the preset start time, so as to determine the start time of the second time range according to the end time of the first time range.

S502. The second user equipment determines an end time of the second time range according to the start time of the second time range and the duration of the second time range.

The second user equipment may determine the end time of the second time range according to a sum of the start time of the second time range and the duration of the second time range.

S503. The second user equipment determines the second time range according to the start time of the second time range and the end time of the second time range.

After the start time and the end time that are of the second time range are determined, the second time range is determined. The second time range is a time period from the start time of the second time range to the end time of the second time range.

Figure 6:
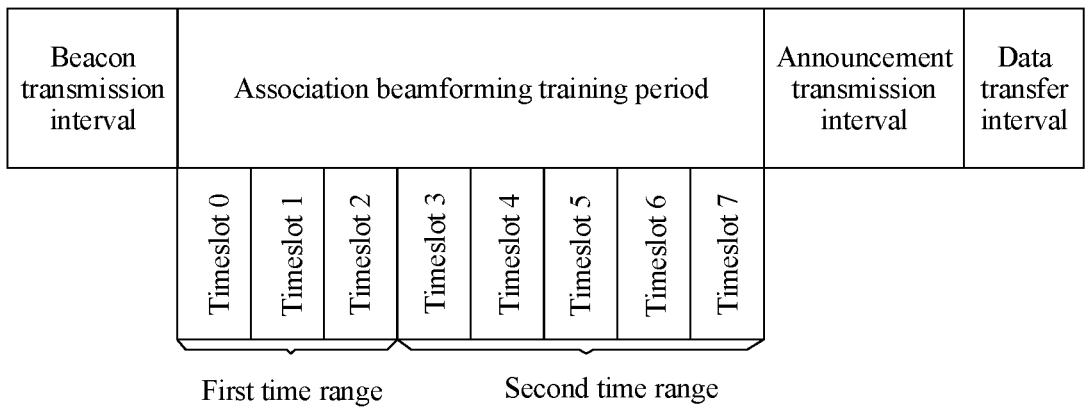
FIG. 6 is a schematic structural diagram of another BI according to Embodiment 2 of this application.

For example, FIG. 6 is a schematic structural diagram of another BI according to Embodiment 2 of this application. If the duration of the first time range is 2, the preset start time is 0, and the start time of the first time range is a timeslot 0 shown in FIG. 6, the end time of the first time range may be a timeslot 2 shown in FIG. 6. For example, the second user equipment may obtain a start time 3 of the second time range by performing an operation of increasing the end time of the first time range by 1. In this case, the start time of the second time range may be a timeslot 3 shown in FIG. 6. If the duration of the second time range is 4, that is, if the second time range may include five timeslots, the end time of the second time range is a timeslot 7. In this case, the second time range may be five timeslots from the timeslot 3 to the timeslot 7 shown in FIG. 6, and the second time range may be represented as [timeslot 3, timeslot 7].

Figure 7:
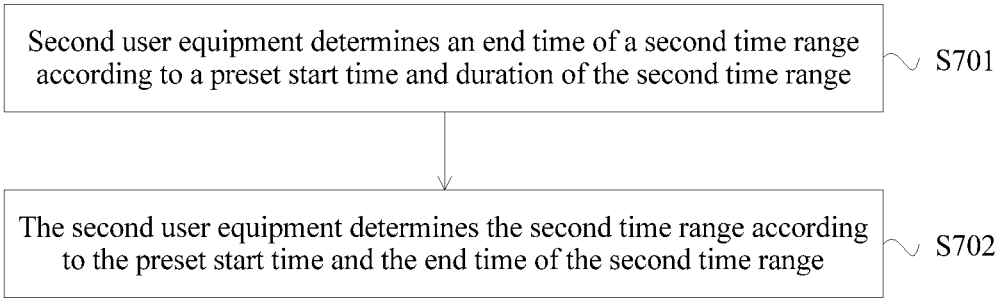
FIG. 7 is a flowchart of determining a second time range in an information transmission according to Embodiment 2 of this application.

Alternatively, in the information transmission method, the second duration information may include duration of the second time range. FIG. 7 is another schematic structural diagram in which second user equipment determines a second time range in the information transmission method according to Embodiment 2 of this application. As shown in FIG. 7, S203 in which second user equipment determines a second time range according to the second duration information may include the following steps.

S701. The second user equipment determines an end time of the second time range according to the preset start time and the duration of the second time range.

In the information transmission method shown in FIG. 7, the second user equipment may use the preset start time as a start time of the second time range.

S702. The second user equipment determines the second time range according to the preset start time and the end time of the second time range.

If the start time of the second time range is the preset start time, the second time range is a time period from the preset start time to the end time of the second time range.

Figure 8:
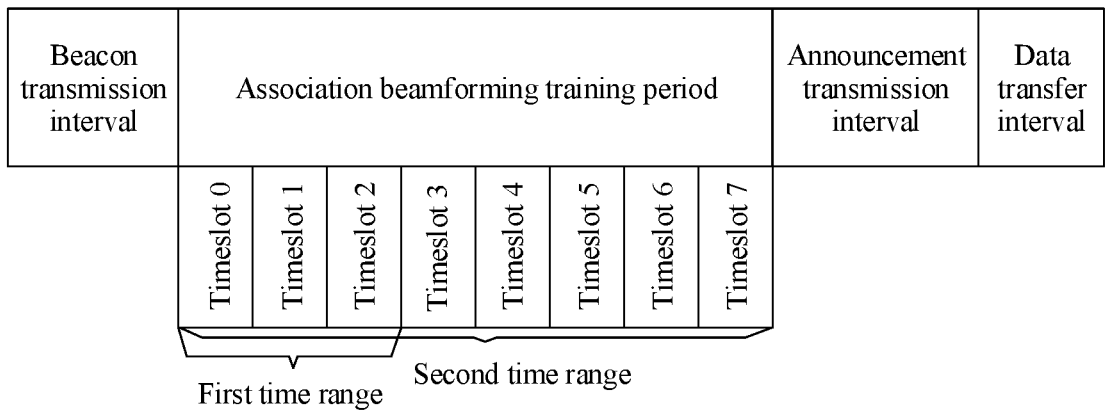
FIG. 8 is a schematic structural diagram of still another BI according to Embodiment 2 of this application.

For example, FIG. 8 is a schematic structural diagram of still another BI according to Embodiment 2 of this application. If the preset start time is 0, the start time of the second time range is a timeslot 0 shown in FIG. 8. If the duration of the second time range is 7, that is, if the second time range may include eight timeslots, the end time of the second time range is a timeslot 7. In this case, the second time range may be eight timeslots from the timeslot 0 to the timeslot 7 shown in FIG. 8, and the second time range may be represented as [timeslot 0, timeslot 7].

An access priority of the second user equipment may be higher than an access priority of the first user equipment. Therefore, in the information transmission method, the first time range and the second time range may have a partially-overlapped time, and the duration of the second time range may be greater than the duration of the first time range, so that a time selection range of the second user equipment is greater than a time selection range of the first user equipment, thereby effectively reducing a probability of an access timeslot conflict of the second user equipment, and improving timeslot resource utilization.

It should be noted that the A-BFT period is described in the foregoing embodiments by using eight timeslots as an example. However, alternatively, the A-BFT period may include another quantity of timeslots, for example, 16 timeslots. The broadcast frame may be, for example, a beacon frame. The network device may further send a broadcast frame before S201 in which a network device sends a broadcast frame. The previously sent broadcast frame may include ATI duration information. The first user equipment and the second user equipment may determine a start time and duration that are of an ATI according to the ATI duration information. The ATI duration information may be located in a start time field and an ATI duration field in a next DMG ATI element in the previously sent broadcast frame. Because the A-BFT period is prior to the ATI, the method may be as follows: An end time of the A-BFT period is determined by allocating the start time of the ATI, so as to prolong duration of the A-BFT period. In this way, the duration of the A-BFT period may be greater than the eight timeslots shown in FIG. 4, FIG. 6, and FIG. 8, so that the first user equipment and the second user equipment can have larger time selection ranges to randomly select timeslots, so as to contend for access.

FIG. 9 is a schematic structural diagram of a next DMG ATI element according to Embodiment 2 of this application. As shown in FIG. 9, the next DMG ATI element may include a 1-byte element identifier (Element ID) field, a 1-byte length field, a 4-byte start time field, and 2-byte ATI duration field.

If a BI does not include an ATI, the BI may include a DTI. In the method, alternatively, a start time and duration that are of the DTI may be determined according to DTI duration information included in a broadcast frame transmitted in a BTI in the BI. The DTI duration information may be located in any allocation field in an extended schedule element in the broadcast frame. Each allocation field may include an allocation start time and allocation duration. Because the A-BFT period is prior to the DTI, the method may be as follows: An end time of the A-BFT period is determined by allocating the start time of the DTI, so as to prolong duration of the A-BFT period. In this way, the duration of the A-BFT period may be greater than the eight timeslots shown in FIG. 4, FIG. 6, and FIG. 8, so that the first user equipment and the second user equipment can have larger time selection ranges to randomly select timeslots, so as to contend for access.

FIG. 10 is a schematic structural diagram of an extended schedule element according to Embodiment 2 of this application. As shown in FIG. 10, the extended schedule element may include a 1-byte element identifier, a 1-byte length, and at least one allocation field. Each allocation field includes 15 bytes. With reference to FIG. 10, each allocation field may include a 2-byte allocation control field, a 2-byte beamforming control field, a 1-byte source association identifier (Source Association IDentity, Source AID) field, a 1-byte destination association identifier (Destination AID) field, a 4-byte allocation start field, a 2-byte allocation block duration field, a 1-byte number of blocks field, and a 2-byte allocation block period field.

Optionally, if the broadcast frame is a beacon frame, the duration of the first time range may be located in an A-BFT length field of a BI control field in the broadcast frame. The duration of the second time range may be located in any one of the following locations in the broadcast frame: at least one bit in the BI control field except the A-BFT length field, or a preset field or information element of a data payload field. The preset field or information element includes at least one bit.

For example, FIG. 11 is a schematic structural diagram of a BI control field according to Embodiment 2 of this application. As shown in FIG. 11, the BI control field may include a 1-bit clustering control present field, a 1-bit discovery mode field, a 4-bit next beacon frame field, a 1-bit ATI present field, a 3-bit A-BFT length field, a 4-bit frame of sector sweep (FSS) field, a 1-bit is responder transmit sector sweep (Is Responder TXSS) field, a 4-bit next A-BFT field, a 1-bit fragmented transmit sector sweep (Fragmented TXSS) field, a 7-bit transmit sector sweep span (TXSS Span) field, a 4-bit N BIs A-BFT field, a 6-bit A-BFT count field, a 6-bit N A-BFT in an antenna interface (N A-BFT in Ant) field, a 1-bit basic service set control point association ready (Personal Basic Service Set Control Point Association Ready, or PCP Association Ready) field, and a 4-bit reserved field.

The duration of the first time range may be located in, for example, the A-BFT length field in FIG. 11, that is, in a bit 7 (B7) to a bit 9 (B9). The duration of the second time range may be located in, for example, the reserved field in the BI control field except the A-BFT length field in FIG. 11, that is, at least one of a bit 44 (B44) to a bit 47 (B47), such as at least one of B44, B45, B46, or B47. Alternatively, the duration of the second time range may be located in at least one bit in another field in the BI control field except the A-BFT length field in FIG. 11.

Optionally, in the information transmission method, the second duration information includes indication information of the end time of the second time range. The start time of the second time range may be determined according to the duration of the first time range. The end time of the second time range is determined according to the indication information of the end time of the second time range.

Figure 11A:
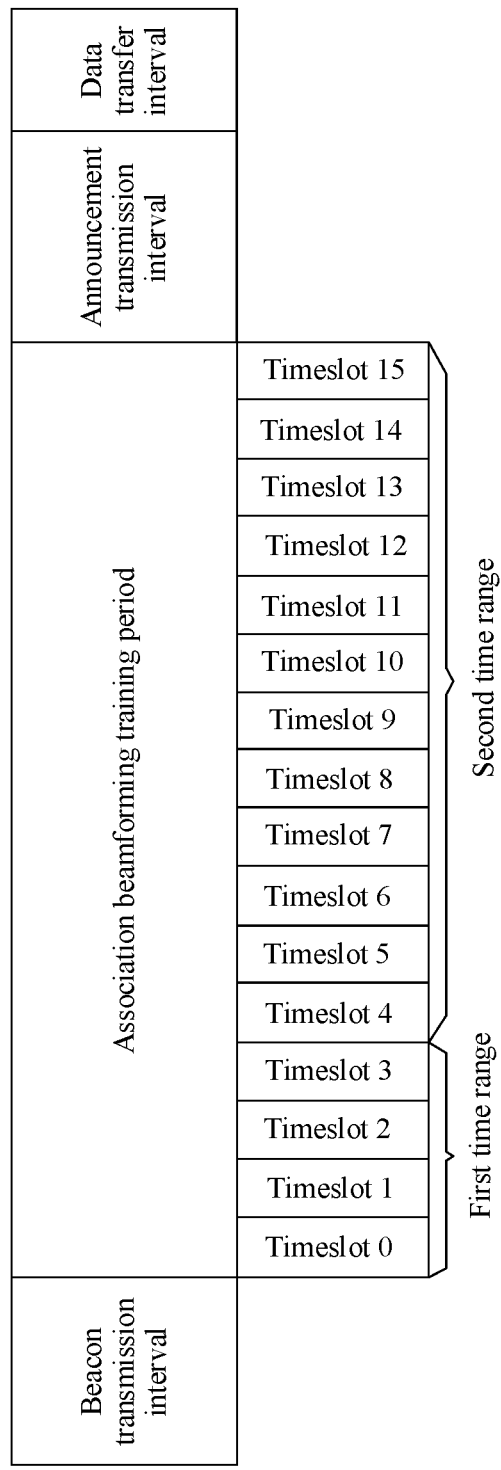
FIG. 11A is a schematic structural diagram of yet another BI according to Embodiment 2 of the present application.
Figure 11B:
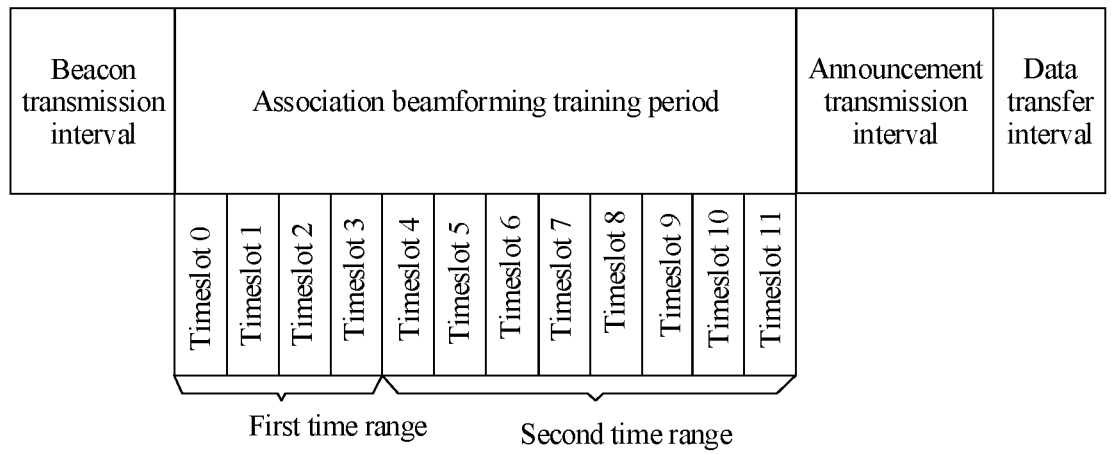
FIG. 11B is a schematic structural diagram of still yet another BI according to Embodiment 2 of the present application.

For example, FIG. 11A is a schematic structural diagram of yet another BI according to Embodiment 2 of the present application. FIG. 11B is a schematic structural diagram of still yet another BI according to Embodiment 2 of the present application. If the preset start time is 0, and the duration of the first time range is 3, the first time range includes four timeslots from a timeslot 0 to a timeslot 3 shown in FIG. 11A and FIG. 11B, and may be represented as [timeslot 0, timeslot 3]. The start time of the second time range may be a timeslot 4. The indication information of the end time of the second time range may be located in, for example, at least one of B44, B45, B46, or B47 in FIG. 11.

In a possible implementation, the indication information of the end time of the second time range may be located in, for example, B44, B45, B46, and B47 in FIG. 11. If (B44 B45 B46 B47)=0000, it may be determined that the BI has no duration corresponding to the second user equipment, that is, the second time range is 0, and the second user equipment does not need to perform beamforming training in the BI. If (B44 B45 B46 B47)=1000, it may be determined, according to preset duration and duration that is determined according to the indication information of the end time of the second time range, that the end time of the second time range is: preset duration+(B44 B45 B46 B47)−1. If the preset duration is 8, the end time of the second time range is a timeslot 15. In this case, the second time range may be [timeslot 4, timeslot 15] shown in FIG. 11A. In the method, the second time range is determined according to the preset duration and the duration that is determined according to the indication information of the end time of the second time range, so that the second time range may be longer, and the second time range may include more timeslots. It should be noted that in the method, the indication information of the end time of the second time range may be located in some of B44, B45, B46, and B47 in FIG. 11, and be unnecessarily located in all of B44, B45, B46, and B47.

In another possible implementation, the indication information of the end time of the second time range may be located in, for example, B45 and B46 in FIG. 11. If (B45 B46)=00, the BI has no duration corresponding to the second user equipment, that is, the second time range is 0, and the second user equipment does not need to perform beamforming training in the BI. If (B45 B46)=01, duration corresponding to the indication information of the end time of the second time range is 4. If (B45 B46)=10, duration corresponding to the indication information of the end time of the second time range is 8. If (B45 B46)=11, duration corresponding to the indication information of the end time of the second time range is 16. If (B45 B46)=10, the second user equipment may determine, according to preset duration and the duration that is corresponding to the indication information of the end time of the second time range, that the end time of the second time range is: preset duration+(B45 B46)−1. If the preset duration is 8, the end time of the second time range is a timeslot 15. In this case, the second time range may be [timeslot 4, timeslot 15] shown in FIG. 11A. It should be noted that in the method, the indication information of the end time of the second time range may be located in another bit in B44, B45, B46, and B47 in FIG. 11, and be unnecessarily located in the bits B45 and B46. In addition, the preset duration may also be another value such as 6 or 7.

In still another possible implementation, the indication information of the end time of the second time range may be located in, for example, B45 and B46 in FIG. 11. If (B45 B46)=00, the BI has no duration corresponding to the second user equipment, that is, the second time range is 0, and the second user equipment does not need to perform beamforming training in the BI. If (B45 B46)=01, duration corresponding to the indication information of the end time of the second time range is 4. If (B45 B46)=10, duration corresponding to the indication information of the end time of the second time range is 8. If (B45 B46)=11, duration corresponding to the indication information of the end time of the second time range is 16. If (B45 B46)=10, the second user equipment may determine, according to the start time of the second time range and the duration that is corresponding to the indication information of the end time of the second time range, that the end time of the second time range is: start time of the second time range+(B45 B46)−1. If the start time of the second time range is 4, the end time of the second time range is a timeslot 11. In this case, the second time range may be [timeslot 4, timeslot 11] shown in FIG. 11B. It should be noted that in the method, the indication information of the end time of the second time range may be located in another bit in B44, B45, B46, and B47 in FIG. 11, and be unnecessarily located in the bits B45 and B46.

It should be noted that in the method, the A-BFT length field indicates the duration of the first time range. If the first user equipment is a DMG station, the duration that is of the first time range and indicated by the A-BFT length field is duration for the DMG station. If bits of a field in which the duration of the first time range is located, for example, (B7 B8 B9)=000, the first time range may include one timeslot, that is, a timeslot 0. Optionally, in the method, the network device may further indicate, by using the next A-BFT field in the BI control field in the broadcast frame, whether the first user equipment needs to perform beamforming training. The network device may indicate, for example, by making a value of the next A-BFT field greater than 0, that the first user equipment does not need to perform beamforming training, so that when the bits of the field in which the duration of the first time range is located, for example, (B7 B8 B9)=000, the second user equipment may determine, according to an indication that the value of the next A-BFT field is greater than 0, that the preset start time such as the timeslot 0 is the start time of the second time range, and accordingly, in a BI, only the second user equipment performs beamforming training, and the first user equipment does not perform beamforming training. The value of the next A-BFT field may be, for example, a value corresponding to the bits from B15 to B18 shown in FIG. 11.

Figure 12:
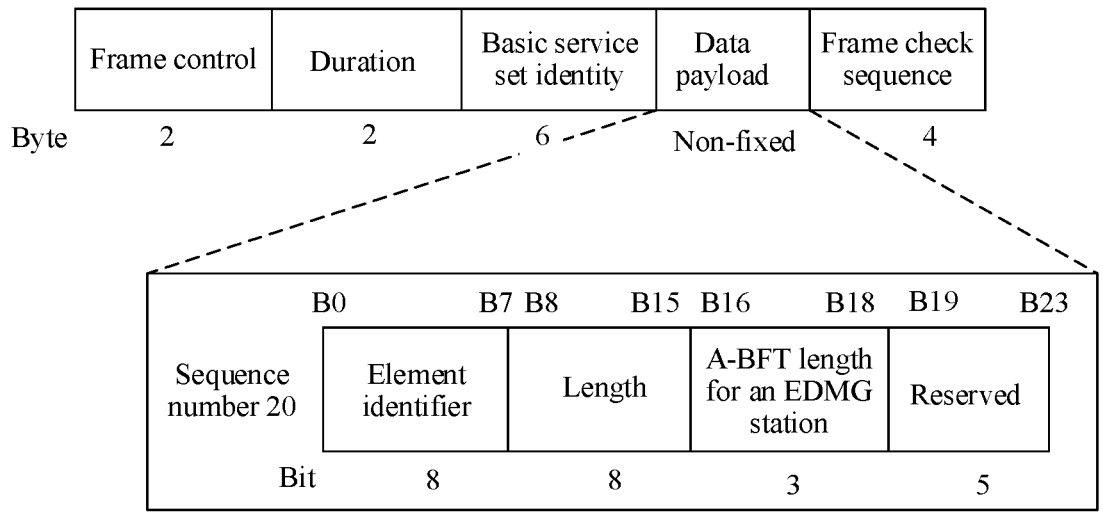
FIG. 12 is a schematic structural diagram of a broadcast frame according to Embodiment 2 of this application.

FIG. 12 is a schematic structural diagram of a broadcast frame according to Embodiment 2 of this application. As shown in FIG. 12, the broadcast frame may include a 2-byte frame control field, a 2-byte duration field, a 6-byte basic service set identity (BSSID) field, a data payload field of a non-fixed quantity of bytes, and a 4-byte frame check sequence (FCS) field. The data payload field may also be referred to as a body field of the broadcast frame. The data payload field may include multiple information elements. In the multiple information elements, a sequence number 1 represents a timestamp element, a sequence number 2 represents a sector sweep element, an element sequence number 3 represents a BI element, a sequence number 4 represents a BI control element, a sequence number 14 represents a multi-band element, and the like. The data payload field may include a newly added field or information element, for example, an information element with a sequence number 20. The newly added field or information element may be, for example, an E-DMG A-BFT allocation element. As shown in FIG. 12, the information element with a sequence number 20 may include, for example, an 8-bit element identifier field, an 8-bit length field, a 3-bit A-BFT length for an EDMG station (A-BFT length for EDMG STA) field, and a 5-bit reserved field. Alternatively, the duration of the second time range may be located in the A-BFT length for an EDMG station field in the information element with a sequence number 20 in the data payload field shown in FIG. 12.

Figure 13:
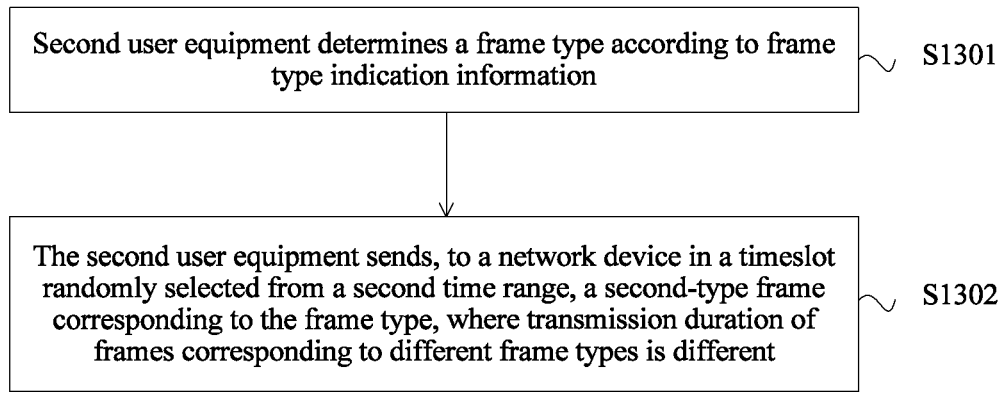
FIG. 13 is a flowchart of another information transmission method according to Embodiment 2 of this application.

Optionally, the broadcast frame may further include frame type indication information. FIG. 13 is a flowchart of another information transmission method according to Embodiment 2 of this application. As shown in FIG. 13, optionally, before S205 in which the second user equipment sends a second-type frame to the network device in the timeslot randomly selected from the second time range, the method may further include the following step:

S1301. The second user equipment determines a frame type according to the frame type indication information.

S205 in which the second user equipment sends a second-type frame to the network device in the timeslot randomly selected from the second time range may include the following step:

S1302. The second user equipment sends, to the network device in the timeslot randomly selected from the second time range, the second-type frame corresponding to the frame type, where transmission duration of frames corresponding to different frame types is different.

Optionally, the second-type frame is an SSW frame or a short sector sweep (SSSW) frame. Transmission duration of the SSW frame is greater than transmission duration of the SSSW frame.

Specifically, the SSW frame may be a frame corresponding to the 802.11ad standard. A frame corresponding to the 802.11ay standard may be an SSW frame, or may be an SSSW frame.

If the second-type frame is the SSSW frame, because the transmission duration of the SSSW frame is less than the transmission duration of the SSW frame, the second user equipment may transmit more second-type frames in the timeslot randomly selected from the second time range, so that the network device can implement more accurate beamforming training of the second user equipment.

Figure 14:
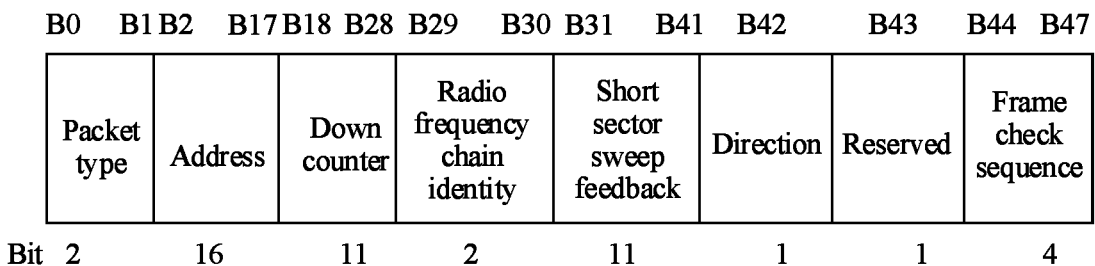
FIG. 14 is a schematic structural diagram of an SSSW frame according to Embodiment 2 of this application.

For example, Embodiment 2 of this application may further provide an SSSW frame. FIG. 14 is a schematic structural diagram of an SSSW frame according to Embodiment 2 of this application. As shown in FIG. 14, the SSSW frame may include a 2-bit packet type field, a 16-bit address field, an 11-bit down counter field, a 2-bit radio frequency chain identity (RF Chain ID) field, an 11-bit short sector sweep feedback (SSSW Feedback) field, a 1-bit direction field, a 1-bit reserved field, and a 4-bit frame check sequence field.

Optionally, if the broadcast frame is a beacon frame, the frame type indication information is located in at least one reserved bit in a DMG parameters field of the broadcast frame.

Figure 15:
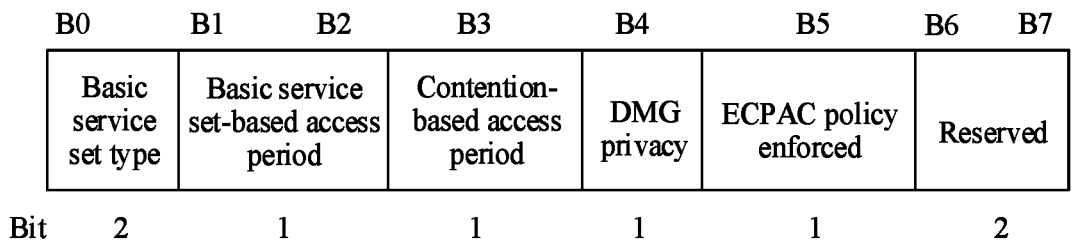
FIG. 15 is a schematic structural diagram of a DMG parameters field according to Embodiment 2 of this application.

FIG. 15 is a schematic structural diagram of a DMG parameters field according to Embodiment 2 of this application. As shown in FIG. 15, the DMG parameters field may include a 2-bit basic service set type (BSS Type) field, a 1-bit contention-based access period only (CBAP Only) field, a 1-bit contention-based access period source (CBAP Source) field, a 1-bit directional multi-gigabit privacy (DMG Privacy) field, a 1-bit ECPAC policy enforced field, and a 2-bit reserved field.

In the information transmission method, the frame type indication information may be located in at least one reserved bit in the DMG parameters field shown in FIG. 15, that is, at least one of a bit 6 or a bit 7 in FIG. 15. The second user equipment may determine a frame type of the second-type frame according to the frame type indication information, so as to determine whether the second-type frame is an SSW frame or an SSSW frame.

Figure 16:
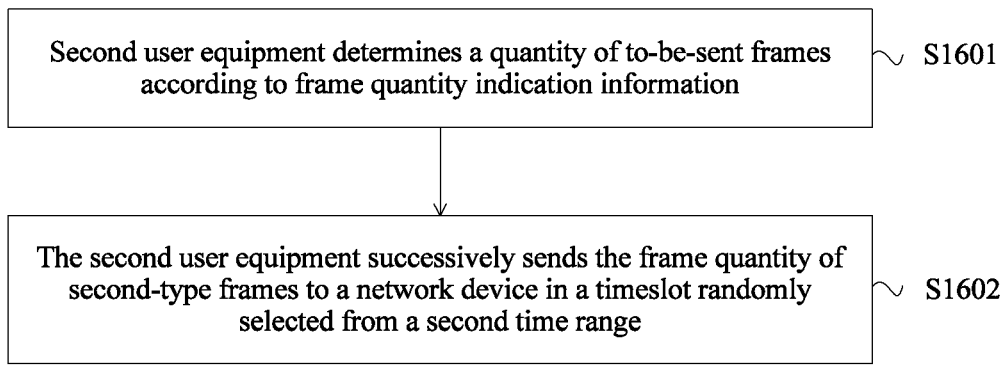
FIG. 16 is a flowchart of still another information transmission method according to Embodiment 2 of this application.

Optionally, the broadcast frame may further include frame quantity indication information. FIG. 16 is a flowchart of still another information transmission method according to Embodiment 2 of this application. As shown in FIG. 16, optionally, before S205 in which the second user equipment sends a second-type frame to the network device in the timeslot randomly selected from the second time range, the method may further include the following step:

S1601. The second user equipment determines a quantity of to-be-sent frames according to the frame quantity indication information.

S205 in which the second user equipment sends a second-type frame to the network device in the timeslot randomly selected from the second time range may include the following step:

S1602. The second user equipment successively sends the frame quantity of the second-type frames to the network device in the timeslot randomly selected from the second time range.

Optionally, before S204 in which the first user equipment sends a first-type frame to the network device in the timeslot randomly selected from the first time range, the method may further include:

determining, by the first user equipment, a quantity of to-be-sent frames according to the frame quantity indication information.

S204 in which the first user equipment sends a first-type frame to the network device in the timeslot randomly selected from the first time range may include:

successively sending, by the first user equipment, the frame quantity of the first-type frames to the network device in the timeslot randomly selected from the first time range.

That is, the frame quantity indication information may be used to indicate a quantity of the second-type frames to be sent by the second user equipment, or may be used to indicate a quantity of the first-type frames to be sent by the first user equipment.

Optionally, if the broadcast frame is a beacon frame, the frame quantity indication information may be located in the FSS field in the BI control field of the broadcast frame shown in FIG. 11, or may be located in an enhanced frame of sector sweep (EFSS) field in the broadcast frame. If the second-type frame is an SSW frame, the frame quantity indication information may be a quantity of SSW frames to be sent by the second user equipment, and the frame quantity indication information may be located in the FSS field in the broadcast frame. If the second-type frame is an SSSW frame, the frame quantity indication information is a quantity of SSSW frames to be sent by the second user equipment, and the frame quantity indication information may be located in the EFSS field in the broadcast frame. The EFSS field may be a reserved field in the broadcast frame, or may be a newly added field in the broadcast frame.

Figure 17:
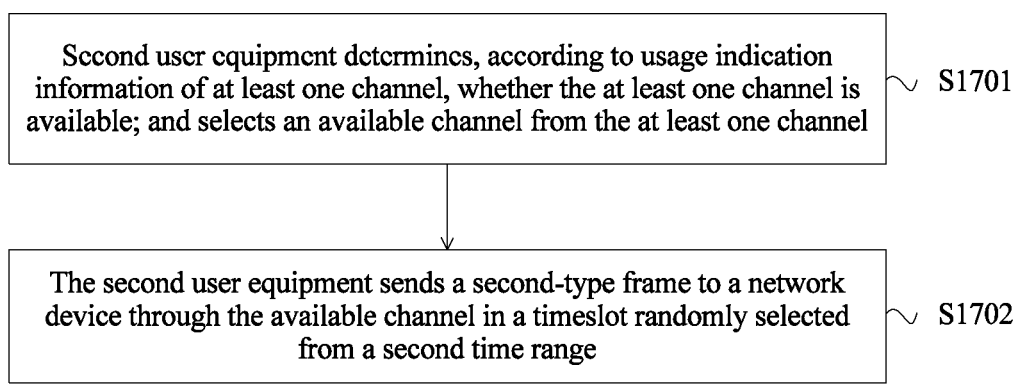
FIG. 17 is a flowchart of an information transmission method according to Embodiment 3 of this application.

Based on the foregoing methods, Embodiment 3 of this application further provides an information transmission method. Optionally, the broadcast frame may further include usage indication information of at least one channel. FIG. 17 is a flowchart of the information transmission method according to Embodiment 3 of this application. As shown in FIG. 17, S205 in which the second user equipment sends a second-type frame to the network device in the timeslot randomly selected from the second time range includes the following steps:

S1701. The second user equipment determines, according to the usage indication information of the at least one channel, whether the at least one channel is available; and selects an available channel from the at least one channel.

S1702. The second user equipment sends the second-type frame to the network device through the available channel in the timeslot randomly selected from the second time range.

The available channel may be a main channel, or may be a secondary channel.

Optionally, S1702 in which the second user equipment sends the second-type frame to the network device through the available channel in the timeslot randomly selected from the second time range may include:

if the available channel is a main channel, sending, by the second user equipment, the second-type frame to the network device through the available channel in the timeslot randomly selected from the second time range.

For example, if the A-BFT period includes eight timeslots from a timeslot 0 to a timeslot 7, the first time range may be three timeslots from the timeslot 0 to the timeslot 2 shown in FIG. 4, and the second time range includes five timeslots from the timeslot 3 to the timeslot 7 shown in FIG. 6. If the available channel selected by the second user equipment is a main channel, the second user equipment may send the second-type frame to the network device through the main channel in a timeslot selected from the timeslot 3 to the timeslot 7.

Figure 18:
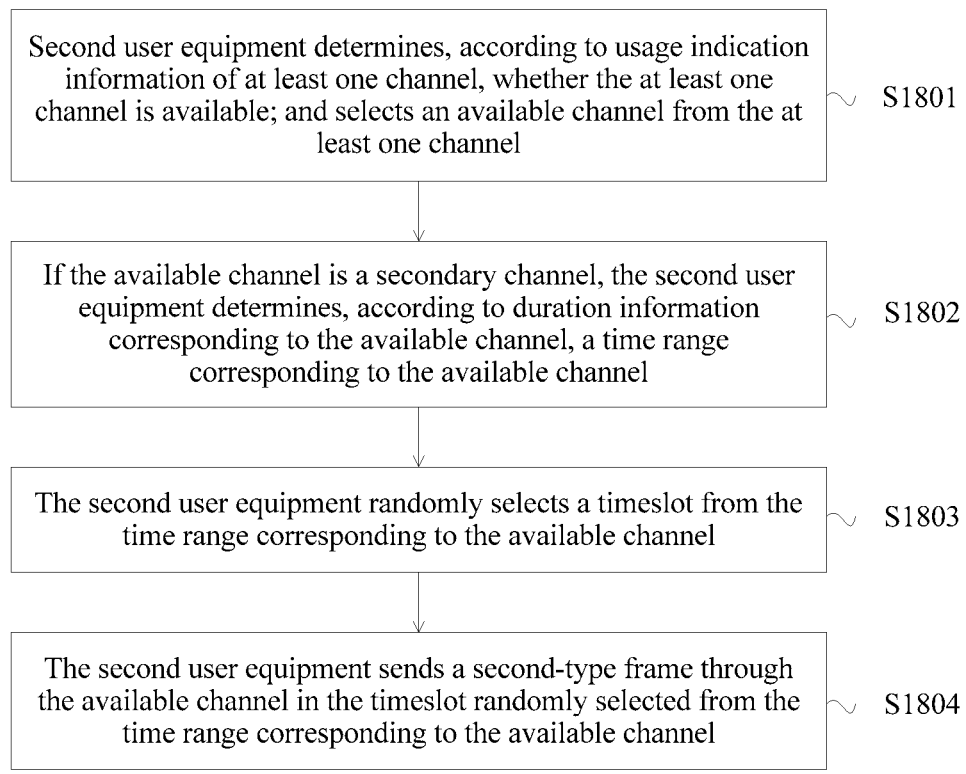
FIG. 18 is a flowchart of another information transmission method according to Embodiment 3 of this application.

Optionally, the broadcast frame may further include usage indication information of at least one channel and duration information corresponding to each channel. FIG. 18 is a flowchart of another information transmission method according to Embodiment 3 of this application. As shown in FIG. 18, the method may further include the following steps.

S1801. The second user equipment determines, according to the usage indication information of the at least one channel, whether the at least one channel is available; and selects an available channel from the at least one channel.

S1802. If the available channel is a secondary channel, the second user equipment determines, according to duration information corresponding to the available channel, a time range corresponding to the available channel.

Each channel has corresponding duration information. A time range corresponding to each channel may be determined according to the duration information corresponding to each channel. Time ranges corresponding to different secondary channels may be the same, or may be different.

For example, if the available channel is a secondary channel, and the secondary channel is a channel 2, the second user equipment may determine, according to duration information corresponding to the channel 2 in the broadcast frame, a time range corresponding to the channel 2.

S1803. The second user equipment randomly selects a timeslot from the time range corresponding to the available channel.

S1804. The second user equipment sends the second-type frame through the available channel in the timeslot randomly selected from the time range corresponding to the available channel.

Optionally, the usage indication information of the at least one channel and/or the duration information corresponding to each channel are/is located in any one of the following locations in the broadcast frame:

at least one reserved bit of a DMG operation information field in a DMG operation element; or a preset field or information element in a data payload field, where the preset field or information element includes at least one bit.

Figure 19:
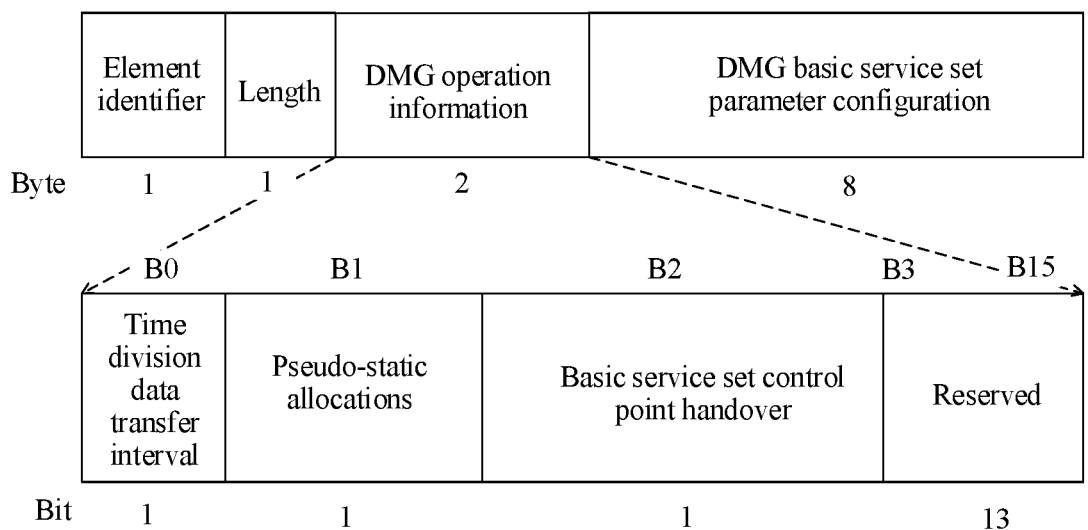
FIG. 19 is a schematic structural diagram of a DMG operation element according to Embodiment 3 of this application.

The following provides description by using instances. FIG. 19 is a schematic structural diagram of a DMG operation element according to Embodiment 3 of this application. As shown in FIG. 19, the DMG operation element may include a 1-byte element identifier field, a 1-byte length field, a 2-byte DMG operation information field, and an 8-byte DMG basic service set parameter configuration field.

The DMG operation information field may include a 1-bit time division data transfer interval (TDDTI) field, a 1-bit pseudo-static allocations field, a 1-bit basic service set control point handover (Personal Basic Service Set Control Point Handover, or PCP Handover) field, and a 13-bit reserved field.

The usage indication information of the at least one channel and/or the duration information corresponding to each channel may be located in, for example, at least one of B3 to B15 shown in FIG. 19 in the broadcast frame.

For example, there are currently four channels, that is, a channel 1, a channel 2, a channel 3, and a channel 4. The channel 1 may be a main channel. Usage indication information of the four channels may be located in B3, B4, B5, and B6 in the reserved field shown in FIG. 19. Alternatively, the broadcast frame may include only usage indication information of a secondary channel. In this case, usage indication information of the three secondary channels may be located in B3, B4, and B5 in the reserved field shown in FIG. 19.

For the secondary channels in the four channels, that is, the channel 2, the channel 3, and the channel 4, duration information corresponding to the channel 2 may be located in, for example, B6, B7, and B8 shown in FIG. 19; duration information corresponding to the channel 3 may be located in, for example, B9, B10, and B11 shown in FIG. 19; and duration information corresponding to the channel 4 may be located in, for example, B12, B13, and B14 shown in FIG. 19.

In another instance, the usage indication information of the at least one channel and/or the duration information corresponding to each channel may be located in the preset field or information element in the data payload field in the broadcast frame.

Figure 20:
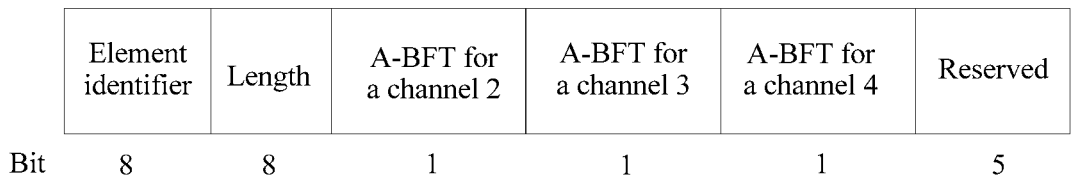
FIG. 20 is a schematic structural diagram of a secondary-channel A-BFT element according to Embodiment 3 of this application.

FIG. 20 is a schematic structural diagram of a secondary-channel A-BFT element according to Embodiment 3 of this application. As shown in FIG. 20, the secondary-channel A-BFT element may include an 8-bit element identifier field, an 8-bit length field, a 1-bit A-BFT for a channel 2 (A-BFT for Secondary channel 2) field, a 1-bit A-BFT for a channel 3 (A-BFT for Secondary channel 3) field, a 1-bit A-BFT for a channel 4 (A-BFT for Secondary channel 4) field, and a 5-bit reserved field. For example, if a value of the A-BFT for a channel 2 field is 1, the channel 2 may be an available channel for the second user equipment, and the second user equipment may send the second-type frame to the network device on the channel 2 to implement beamforming training. If a value of the A-BFT for a channel 2 field is 0, the channel 2 is unavailable to the second user equipment, and the second user equipment cannot send the second-type frame to the network device on the channel 2 to implement beamforming training.

Figure 21:
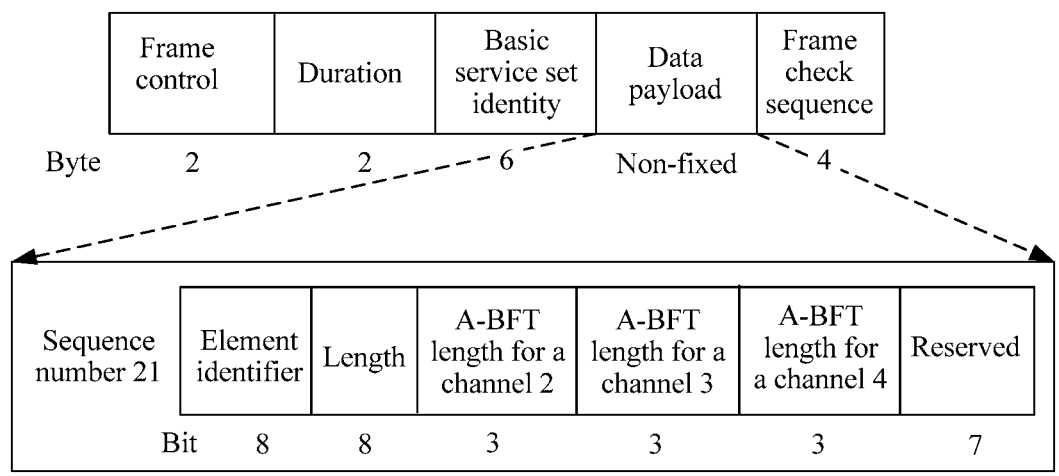
FIG. 21 is a schematic structural diagram of a broadcast frame according to Embodiment 3 of this application.

FIG. 21 is a schematic structural diagram of a broadcast frame according to Embodiment 3 of this application. As shown in FIG. 21, the broadcast frame may include a 2-byte frame control field, a 2-byte duration field, a 6-byte basic service set identity field, a data payload field of a non-fixed quantity of bytes, and a 4-byte frame check sequence field. The data payload field may also be referred to as a body field of the broadcast frame. The data payload field may include multiple information elements. The data payload field may include a newly added field or information element, for example, an information element with a sequence number 21. The newly added field or information element may be, for example, a secondary-channel A-BFT allocation element. As shown in FIG. 21, the information element with a sequence number 21 may include, for example, an 8-bit element identifier field, an 8-bit length field, a 3-bit A-BFT length for a channel 2 (A-BFT Length for Secondary channel 2) field, a 3-bit A-BFT length for a channel 3 (A-BFT Length for Secondary channel 3) field, a 3-bit A-BFT length for a channel 4 (A-BFT Length for Secondary channel 4) field, and a 7-bit reserved field.

For the secondary channels in the four channels, that is, the channel 2, the channel 3, and the channel 4, duration information corresponding to the channel 2 may be located in, for example, the A-BFT length for a channel 2 field shown in FIG. 21; duration information corresponding to the channel 3 may be located in, for example, the A-BFT length for a channel 3 field shown in FIG. 21; and duration information corresponding to the channel 4 may be located in, for example, the A-BFT length for a channel 4 field shown in FIG. 21.

Figure 22:
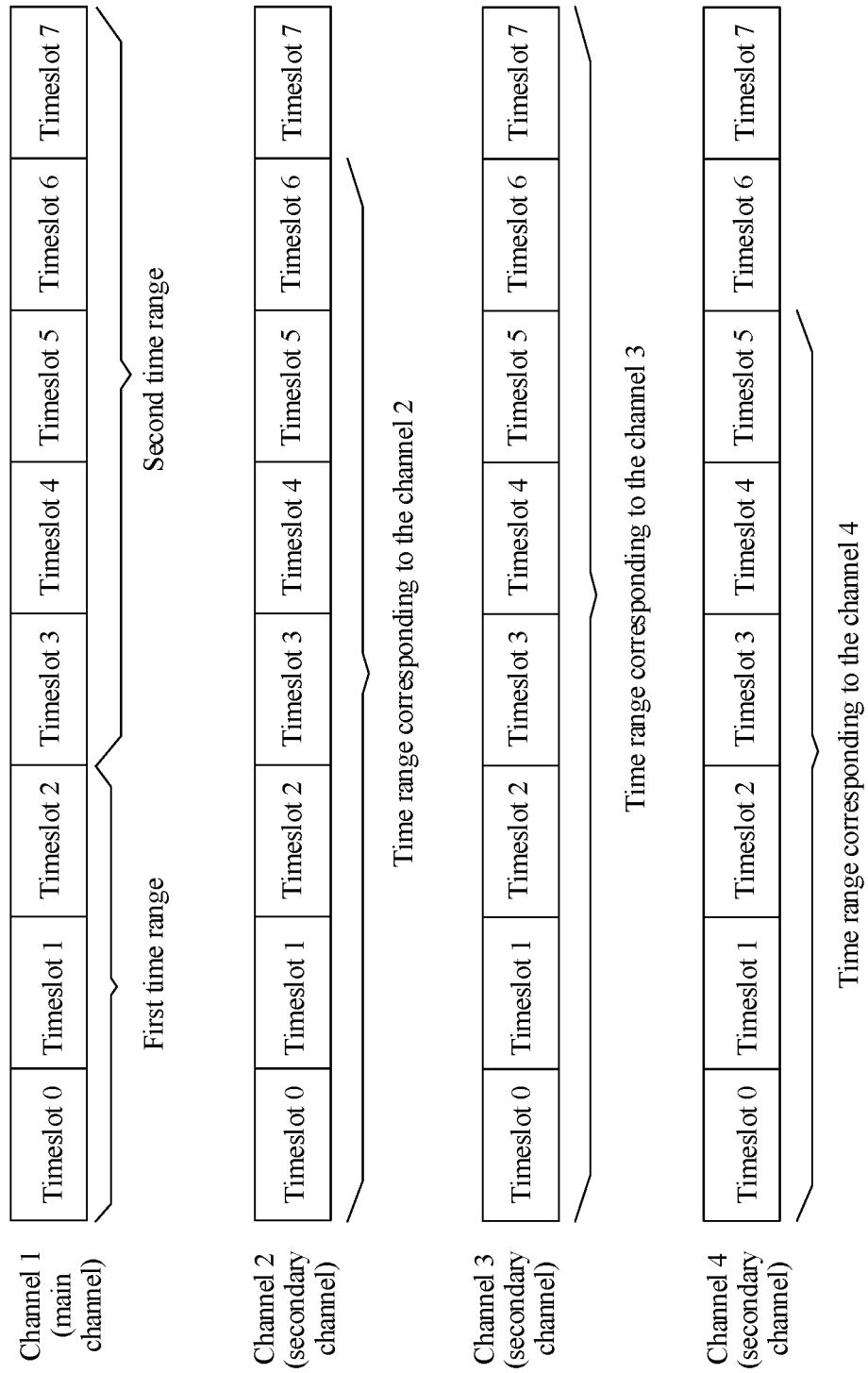
FIG. 22 is a diagram of a correspondence between a time range and a channel according to Embodiment 3 of this application.

FIG. 22 is a diagram of a correspondence of time ranges corresponding to channels according to Embodiment 3 of this application. As shown in FIG. 22, if the available channel selected by the second user equipment is a main channel, that is, the channel 1, the second user equipment may select a timeslot from a timeslot 3 to a timeslot 7 shown in FIG. 22, so as to send the second-type frame to the network device through the channel 1 in the selected timeslot. If the available channel selected by the second user equipment is a secondary channel, such as the channel 2, the second user equipment may select a timeslot from the timeslot 0 to a timeslot 6 shown in FIG. 22, so as to send the second-type frame to the network device through the channel 2 in the selected timeslot. If the available channel selected by the second user equipment is the channel 3, the second user equipment may select a timeslot from the timeslot 0 to a timeslot 7 shown in FIG. 22, so as to send the second-type frame to the network device through the channel 3 in the selected timeslot. If the available channel selected by the second user equipment is the channel 4, the second user equipment may select a timeslot from the timeslot 0 to a timeslot 5 shown in FIG. 22, so as to send the second-type frame to the network device through the channel 4 in the selected timeslot.

It should be noted that FIG. 19 to FIG. 22 are merely instances for description. Alternatively, the usage indication information of the at least one channel and/or the duration information corresponding to each channel may be located in another location in the broadcast frame. This is not limited in this application.

Figure 23:
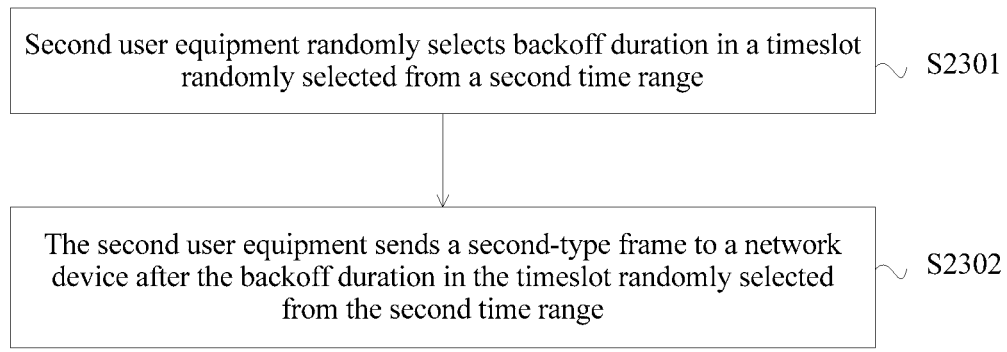
FIG. 23 is a flowchart of still another information transmission method according to Embodiment 3 of this application.

Based on the foregoing methods, optionally, Embodiment 3 of this application further provides an information transmission method. FIG. 23 is a flowchart of still another information transmission method according to Embodiment 3 of this application. As shown in FIG. 23, the method is based on the foregoing embodiments. Before S205 in which the second user equipment sends a second-type frame to the network device in the timeslot randomly selected from the second time range, the method may further include the following step:

S2301. The second user equipment randomly selects backoff duration in the timeslot randomly selected from the second time range.

Step S205 in which the second user equipment sends a second-type frame to the network device in the timeslot randomly selected from the second time range may include the following step:

S2302. The second user equipment sends the second-type frame to the network device after the backoff duration in the timeslot randomly selected from the second time range.

The second user equipment randomly selects the timeslot from the second time range to implement first-time backoff, and randomly selects the backoff duration in the timeslot randomly selected from the second time range, to implement second-time backoff. After the second user equipment selects the backoff duration, when the timeslot randomly selected by the second user equipment from the second time range arrives, the second user equipment does not instantly send the second-type frame, but starts a countdown timer corresponding to the backoff duration. When the countdown timer corresponding to the backoff duration is 0, that is, after the backoff duration, the second user equipment may send the second-type frame. The second user equipment randomly selects the backoff duration in the timeslot randomly selected from the second time range. Therefore, even if another user equipment also selects the same timeslot from the second time range, because each user equipment further randomly selects backoff duration, a possibility that the randomly selected backoff duration is different is relatively high. Therefore, user equipment with shorter backoff duration may preferentially send the second-type frame in the same timeslot, and user equipment with longer backoff duration may not send the second-type frame, after the backoff duration, when detecting, by means of carrier sense or clear channel assessment (CCA), that a channel is busy, so as to avoid interference imposed on the user equipment that preferentially sends the second-type frame, effectively reduce a collision within the timeslot, and improve training efficiency of the A-BFT.

Figure 24:
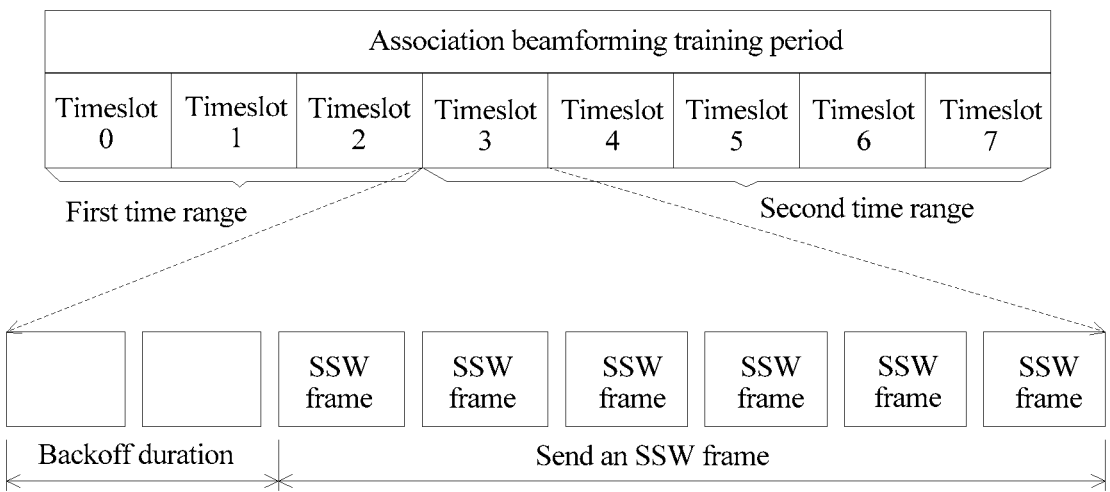
FIG. 24 is a schematic structural diagram of an A-BFT period according to Embodiment 3 of this application.

For example, FIG. 24 is a schematic structural diagram of an A-BFT period according to Embodiment 3 of this application. As shown in FIG. 24, the A-BFT period may include eight timeslots from a timeslot 0 to a timeslot 7. The first time range ranges from the timeslot 0 to the timeslot 2, and the second time range ranges from the timeslot 3 to the timeslot 7. If the timeslot randomly selected by the second user equipment from the second time range is the timeslot 3, the second user equipment randomly selects backoff duration in the timeslot 3, and may send the second-type frame such as an SSW frame after the backoff duration.

Figure 25:
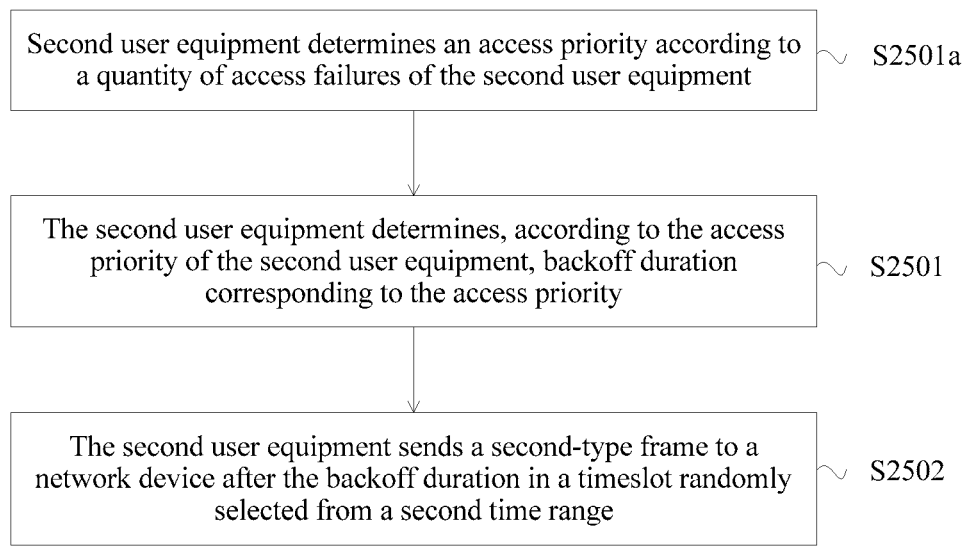
FIG. 25 is a flowchart of yet another information transmission method according to Embodiment 3 of this application.

Alternatively, Embodiment 3 of this application further provides an information transmission method. FIG. 25 is a flowchart of yet another information transmission method according to Embodiment 3 of this application. As shown in FIG. 25, the method is based on the foregoing embodiments. Before S205 in which the second user equipment sends a second-type frame to the network device in the timeslot randomly selected from the second time range, the method may further include the following step:

S2501. The second user equipment determines, according to an access priority of the second user equipment, backoff duration corresponding to the access priority.

A higher access priority indicates shorter backoff duration. A lower access priority indicates longer backoff duration.

That is, in the information transmission method, the backoff duration may be determined according to the access priority of the second user equipment, and be unnecessarily randomly selected.

S205 in which the second user equipment sends a second-type frame to the network device in the timeslot randomly selected from the second time range may include the following step:

S2502. The second user equipment sends the second-type frame to the network device after the backoff duration in the timeslot randomly selected from the second time range.

In a dense scenario, a probability of a timeslot conflict that occurs during the A-BFT period when multiple user equipments perform beamforming training is relatively high. To achieve an objective that user equipment that still cannot perform access after multiple training periods quickly accesses the network device, to quickly complete beamforming training, thereby improving training timeliness, and improving user experience, in the information transmission method, the access priority may be determined according to a quantity of access failures of the second user equipment. A larger quantity of access failures indicates a higher access priority, so that backoff duration for the user equipment reduces as the quantity of access failures increases.

To reduce a timeslot conflict between user equipments, in the information transmission method, alternatively, the access priority may be determined according to a quantity of access failures of the second user equipment. A larger quantity of access failures indicates a lower access priority, so that backoff duration for the user equipment increases as the quantity of access failures increases, and user equipments with different quantities of access failures accordingly have different backoff duration, so as to effectively reduce the timeslot conflict.

To reduce a timeslot conflict between user equipments, in the information transmission method, a quantity of access failures of the user equipment may be unrelated to backoff duration, that is, the access priority may be determined according to another parameter of the user equipment. Therefore, the backoff duration may remain unchanged as the quantity of access failures increases.

Figure 26:
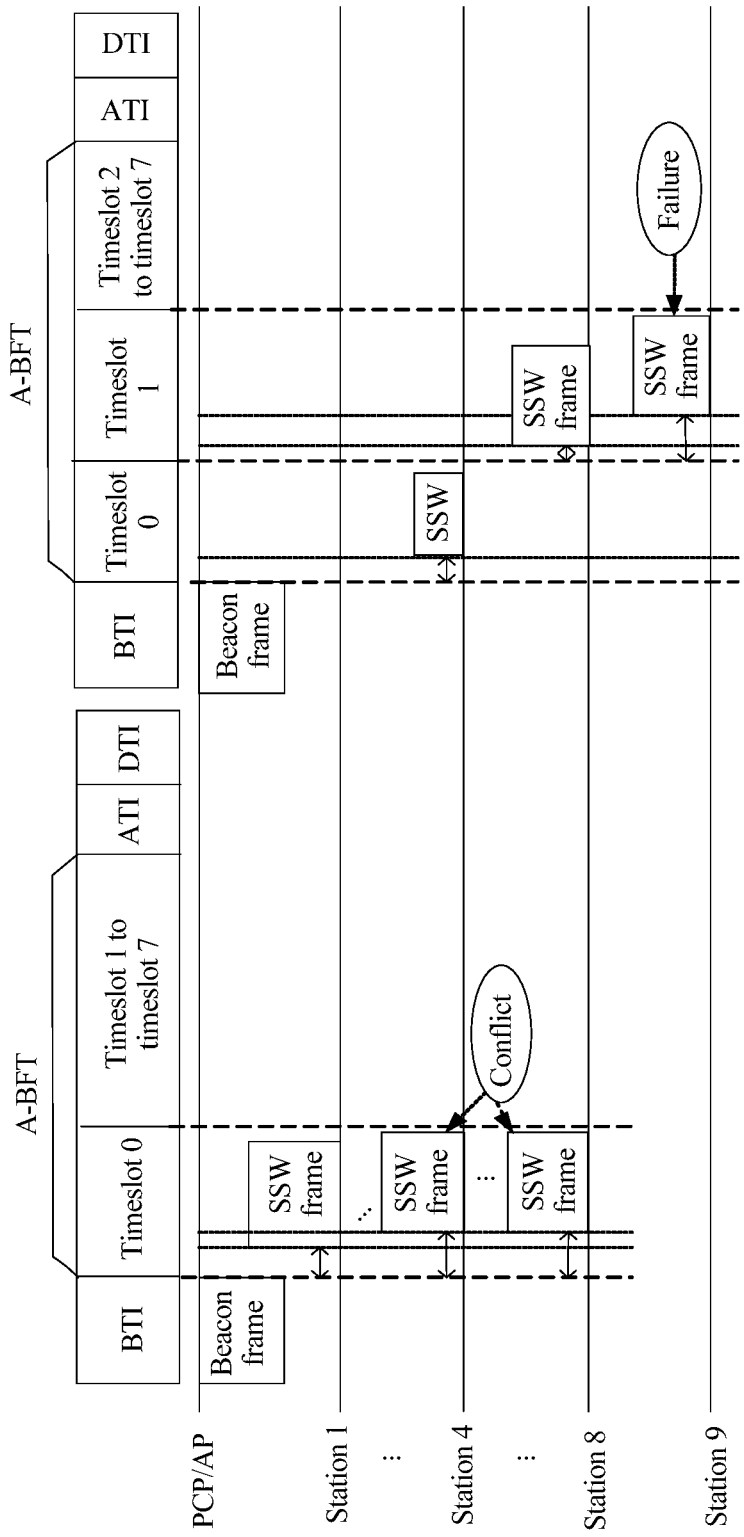
FIG. 26 is a schematic diagram of a message between a PCP/AP and a station in yet another information transmission method according to Embodiment 3 of this application.

For example, if the network device is a PCP/AP, and the user equipment is a station, the station may be an EDMG station, and a time range corresponding to the station may include eight timeslots from a timeslot 0 to a timeslot 7. FIG. 26 is a schematic diagram of a message between a PCP/AP and a station in yet another information transmission method according to Embodiment 3 of this application. As shown in FIG. 26, in a first period, the PCP/AP may send a beacon frame in a BTI in a broadcast manner. All of a station 1, a station 4, and a station 8 select a timeslot 0 in the time range, backoff duration selected by the station 1 in the timeslot 0 may be less than backoff duration for the station 4 and that for the station 8. Therefore, the station 1 may preferentially send an SSW frame, to preferentially perform access. A timeslot conflict occurs between the station 4 and the station 8 in the timeslot 0. Consequently, both access of the station 4 and access of the station 8 fail. In a second period, a timeslot selected by the station 4 in the time range is a timeslot 0, and timeslots selected by the station 8 and a station 9 in the time range are a timeslot 1. The station 8 is user equipment whose access fails in the first period, and the station 9 is new user equipment. Therefore, an access priority of the station 8 may be higher than an access priority of the station 9. Backoff duration that may be selected by the station 8 in the timeslot 1 may be less than backoff duration selected by the station 9 in the timeslot 1. Therefore, access of the station 8 may succeed in the timeslot 1, and access of the station 9 may fail in the timeslot 1. Only the station 4 sends an SSW frame in the timeslot 0. Therefore, access of the station 4 succeeds in the timeslot 0. As shown above, a period is a BI.

Optionally, S2501 in which the second user equipment determines, according to an access priority of the second user equipment, backoff duration corresponding to the access priority may include the following step:

S2501a. The second user equipment determines the access priority according to a quantity of access failures of the second user equipment.

A larger quantity of access failures indicates a higher access priority.

Optionally, a larger quantity of access failures may indicate a lower access priority.

It should be noted that in the information transmission method shown in FIG. 25, the access priority is determined according to the quantity of access failures. Alternatively, the second user equipment may determine the access priority according to another parameter in addition to the quantity of access failures. Details are not described herein in this application.

The following provides description by using two specific instances.

In an instance, if the second user equipment is new user equipment, that is, if a quantity of access failures of the second user equipment is 0, the second user equipment may determine a backoff window according to the following formula (1), so as to determine the backoff duration from the backoff window:

$$t_1 = 2^{F_{max}} \qquad \text{Formula (1)},$$

where $t_1$ is the backoff window determined by the second user equipment, and $F_{max}$ is a preset maximum quantity of access failures. $F_{max}$ may be less than dot11RSSRetryLimit, where dot11RSSRetryLimit may be, for example, a responder sector sweep (RSS) retry limit in the 802.11 standard. If the second user equipment is new user equipment, the backoff duration time$_1$ for the second user equipment may fall within [0, t$_1$] that is, time$_1$~U[0,t$_1$].

If the second user equipment is user equipment whose access fails, that is, if a quantity of access failures of the second user equipment is greater than 0, the second user equipment may determine a backoff window according to the following formula (2):

$$t_2 = 2^{F_{max}-F} \qquad \text{Formula (2)},$$

where $t_2$ is the backoff window determined by the second user equipment, F is the quantity of access failures of the second user equipment, and F may be determined according to a value of an attempt failure counter corresponding to the second user equipment. The attempt failure counter may be, for example, a FailedRSSattempts counter. F may be less than or equal to $F_{max}$, that is, F may be a minimum value between F and $F_{max}$, and this is represented as F=min{F, $F_{max}$}. If the second user equipment is user equipment whose access fails, backoff duration time$_2$ for the second user equipment may fall within [0,t$_2$], that is, time$_2$~U[0,t$_2$].

In the foregoing instance, if the quantity of access failures is less than or equal to the preset maximum quantity of access failures, the backoff duration for the second user equipment may reduce as the quantity of access failures increases. If the quantity of access failures is greater than the preset maximum quantity of access failures, the backoff duration for the second user equipment is equal to backoff duration corresponding to the maximum quantity of access failures, and does not continue to reduce as the quantity of failures increases.

Figure 27:
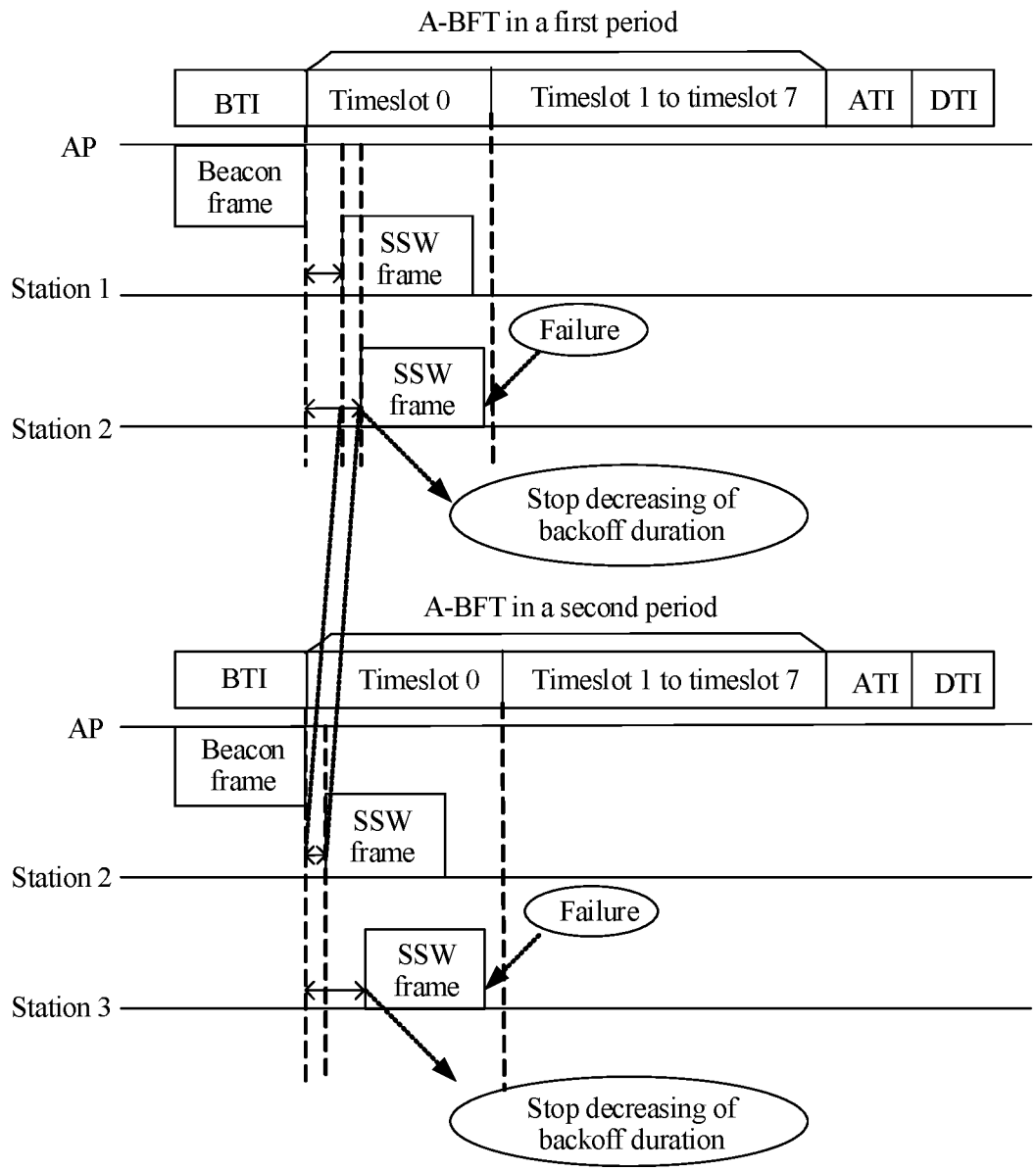
FIG. 27 is a schematic diagram of another message between an AP and a station in yet another information transmission method according to Embodiment 3 of this application.

In another instance, if the network device is an AP, and the user equipment is a station, the station may be an EDMG station, and a time range corresponding to the station may include eight timeslots from a timeslot 0 to a timeslot 7. FIG. 27 is a schematic diagram of another message between an AP and a station in yet another information transmission method according to Embodiment 3 of this application. As shown in FIG. 27, in a first period, the AP may broadcast a beacon frame in a BTI. A station 1 and a station 2 select a timeslot 0 in the time range. Backoff duration selected by the station 1 in the timeslot 0 may be less than backoff duration selected by the station 2 in the timeslot 0. Therefore, the backoff duration for the station 1 may preferentially decrease to 0. In this case, the station 1 may preferentially send an SSW frame, to preferentially perform access. The station 2 maintains a channel sensing state in the backoff duration. When the station 1 sends the SSW frame, the station 2 detects that a channel is busy, the station 2 does not send an SSW frame, and access of the station 2 fails. At the same time, the station 2 may stop decreasing of the backoff duration for the station 2. In a second period, if both the station 2 and a new station 3 select a timeslot 0 in the time range, the station 2 starts decreasing of the backoff duration for the station 2 again in the timeslot 0, and sends the SSW frame when the backoff duration for the station 2 decreases to 0. Backoff duration for the station 3, as new user equipment, in the timeslot 0 may be greater than the backoff duration for the station 2 in the second period. Therefore, the station 2 preferentially sends the SSW frame, to preferentially perform access. The station 3 maintains a channel sensing state in the backoff duration. When the station 2 sends the SSW frame, the station 3 detects that a channel is busy, the station 3 does not send an SSW frame, and access of the station 3 fails. At the same time, the station 3 may stop decreasing of the backoff duration for the station 3.

It should be noted that in the method instance, backoff duration selected by new user equipment in a timeslot selected by the new user equipment may be preset maximum backoff duration. That is, in the first period in FIG. 27, the backoff duration selected by the station 1 and the station 2 in the timeslot 0 may be the preset maximum backoff duration, and the backoff duration selected by the station 3 in the timeslot 0 in the second period may be the preset maximum backoff duration.

To reduce a probability that a timeslot collision occurs between different user equipments in a same timeslot, the backoff duration in the foregoing embodiment may gradually decrease as a quantity of access failures increases; or may be fixed backoff duration, that is, does not change as a quantity of access failures increases; or the backoff duration may increase as a quantity of failures increases.

The instances are merely examples for description. This is not limited in this application.

Figure 28:
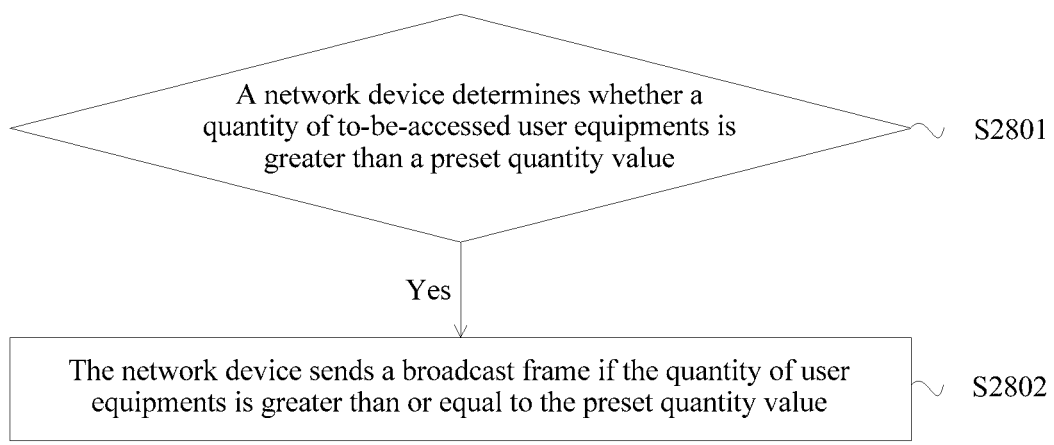
FIG. 28 is a flowchart of still another information transmission method according to Embodiment 3 of this application.

Embodiment 3 of this application may further provide an information transmission method. FIG. 28 is a flowchart of still another information transmission method according to Embodiment 3 of this application. As shown in FIG. 28, before S201 in which a network device sends a broadcast frame, the method may further include the following step:

S2801. The network device determines whether a quantity of to-be-accessed user equipments is greater than a preset quantity value.

S201 in which a network device sends a broadcast frame may include the following step:

S2802. The network device sends the broadcast frame if the quantity of user equipments is greater than or equal to the preset quantity value.

That is, if the quantity of user equipments is greater than or equal to the preset quantity value, the network device may send the broadcast frame that includes multiple pieces of duration information of the A-BFT, so as to perform the information transmission method in any one of the foregoing embodiments. However, to avoid resource waste caused by backoff duration, if the quantity of user equipments is less than the preset quantity value, the network device may further send a conventional broadcast frame, that is, a broadcast frame that includes one piece of duration information of the A-BFT.

It should be noted that after at least one BI after startup, the network device may determine, by performing S2801 of determining whether the quantity of to-be-accessed user equipments is greater than the preset quantity value, whether the user equipment is to perform a separated A-BFT method. If the quantity of user equipments is greater than or equal to the preset quantity value, the network device determines that the user equipment may perform the separated A-BFT, so as to perform S2802 in which the network device may send the broadcast frame that includes multiple pieces of duration information of the A-BFT. However, in the at least one BI after startup, the broadcast frame sent by the network device may include only one piece of duration information of the A-BFT, that is, the user equipment does not perform the separated A-BFT solution in the at least one BI.

Optionally, the broadcast frame may further include overload indicator (OI) information. The overload indicator information is located in any one of the following locations: a reserved bit of a BI control field of a frame control field, or a reserved bit of another field other than the BI control field.

Figure 29:
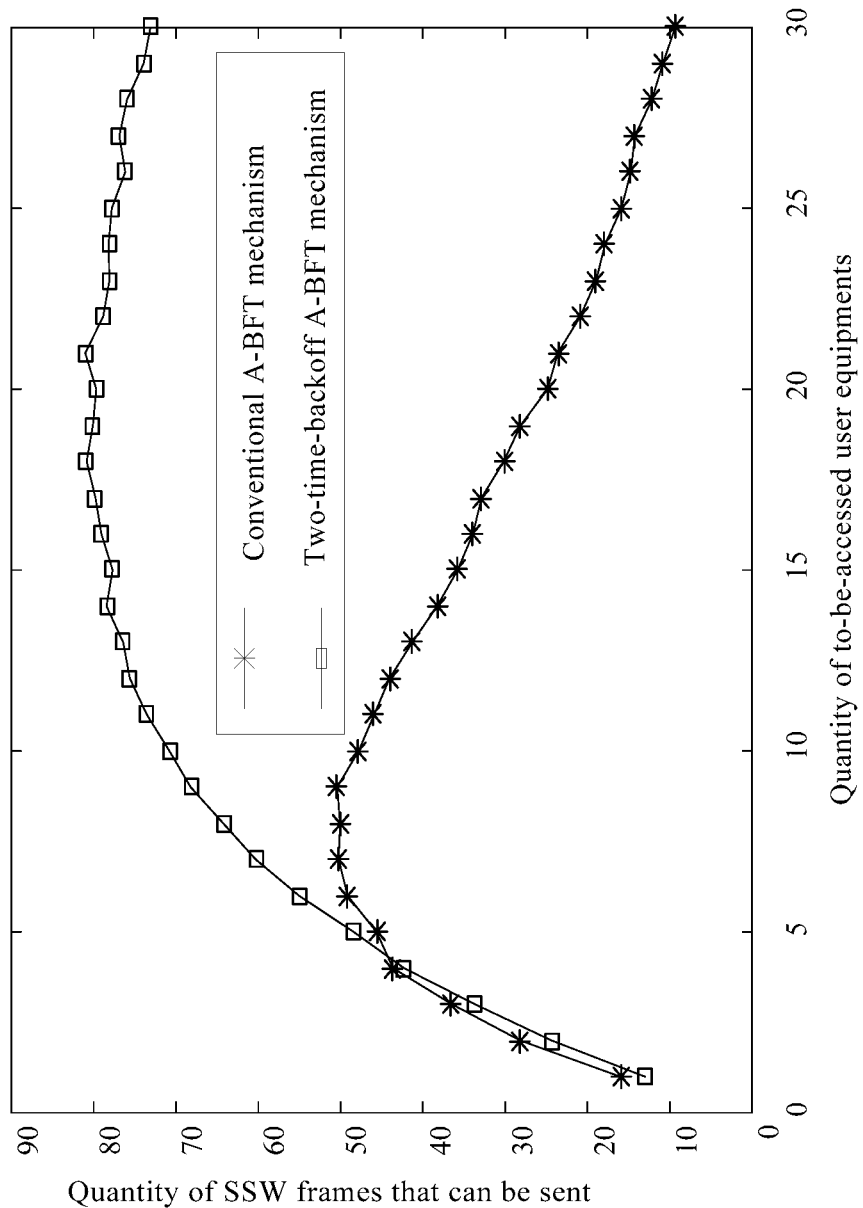
FIG. 29 is a diagram of a correspondence between a quantity of to-be-accessed user equipments and a quantity of SSW frames that can be sent according to Embodiment 3 of this application.

FIG. 29 is a diagram of a correspondence between a quantity of to-be-accessed user equipments and a quantity of SSW frames that can be sent according to Embodiment 3 of this application. As shown in FIG. 29, if the quantity of to-be-accessed user equipments is greater than 5, a quantity of SSW frames that can be sent by each user equipment by using a conventional A-BFT mechanism may be less than a quantity of SSW frames that can be sent by using a two-time-backoff A-BFT mechanism. That is, if the quantity of to-be-accessed user equipments is greater than 5, the quantity of SSW frames that can be sent may be increased by using the two-time-backoff mechanism, and system performance is improved. If the quantity of to-be-accessed user equipments is less than 5, a quantity of SSW frames that can be sent by each user equipment by using a conventional A-BFT mechanism may be greater than a quantity of SSW frames that can be sent by using a two-time-backoff A-BFT mechanism. In this way, SSW frame sending opportunity waste caused by backoff duration may be effectively avoided.

Figure 30:
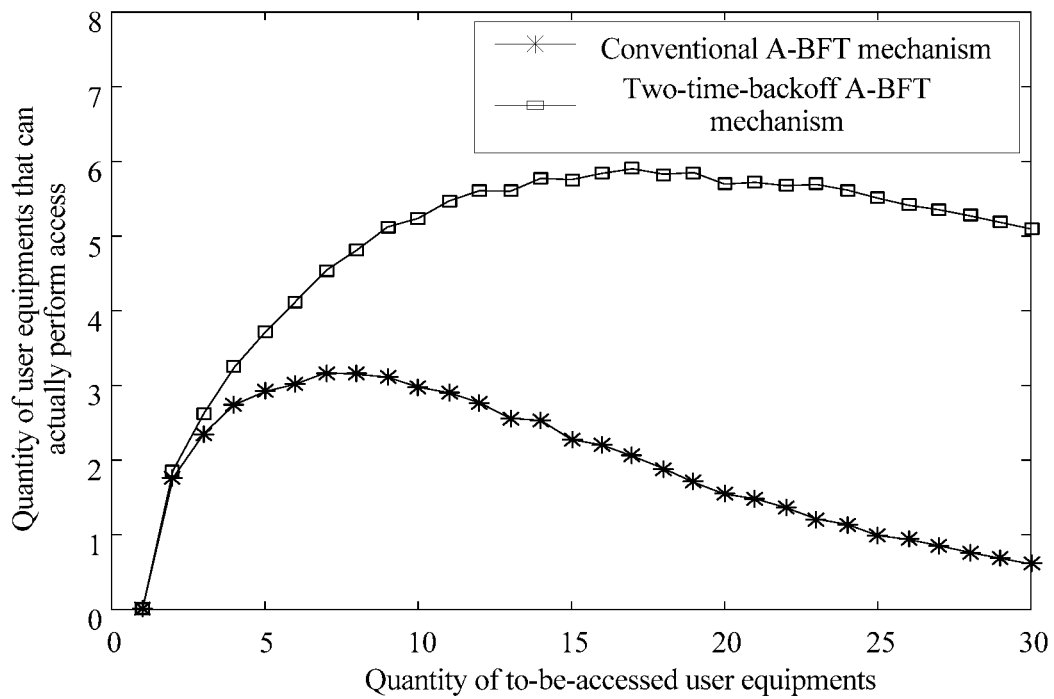
FIG. 30 is a diagram of a correspondence between a quantity of to-be-accessed user equipments and a quantity of user equipments that can actually access a network device according to Embodiment 3 of this application.

FIG. 30 is a diagram of a correspondence between a quantity of to-be-accessed user equipments and a quantity of user equipments that can actually access a network device according to Embodiment 3 of this application. It can be learned from FIG. 30 that when the quantity of to-be-accessed user equipments is relatively large, a quantity of user equipments that can perform access may be effectively increased by using the two-time-backoff A-BFT mechanism, and training efficiency is improved.

It should be noted that, the conventional A-BFT mechanism in FIG. 29 and FIG. 30 may be, for example, a manner in which the broadcast frame sent by the network device may include one piece of duration information of A-BFT, and each user equipment randomly selects a timeslot in an A-BFT period, so as to send an SSW frame in the selected timeslot. The two-time-backoff A-BFT mechanism may be, for example, a manner in which the broadcast frame sent by the network device may include multiple pieces of duration information of A-BFT, and each user equipment selects a timeslot from a corresponding time range, and selects backoff duration in the selected timeslot, so as to send an SSW frame after the backoff duration in the selected timeslot. In addition to two-time backoff, the information transmission method in this application may include multiple-time backoff, that is, after selecting the backoff duration, the user equipment may further select backoff duration to send the SSW frame after the selected backoff duration, so as to implement the multiple-time backoff. The foregoing is only an instance for description. This is not limited in this application.

Figure 31:
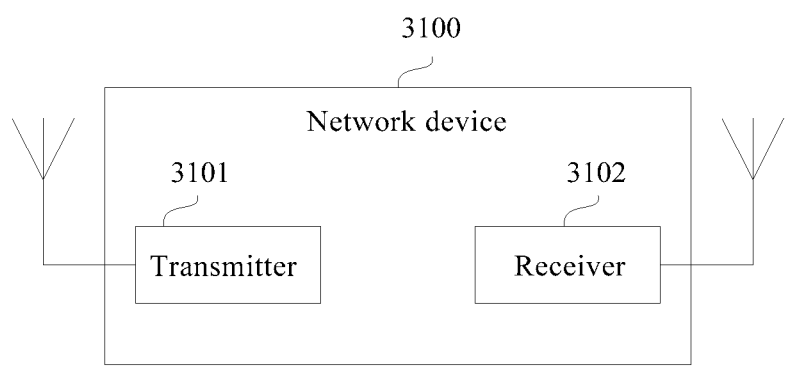
FIG. 31 is a schematic structural diagram of a network device according to Embodiment 4 of this application.

Embodiment 4 of this application may further provide a network device. FIG. 31 is a schematic structural diagram of the network device according to Embodiment 4 of this application. As shown in FIG. 31, the network device 3100 may include a transmitter 3101 and a receiver 3102.

The transmitter 3101 is configured to send a broadcast frame. The broadcast frame includes first duration information and second duration information that are of A-BFT. The first duration information is used by a first user equipment to determine a first time range, so that the first user equipment randomly selects a timeslot from the first time range. The second duration information is used by a second user equipment to determine a second time range, so that the second user equipment randomly selects a timeslot from the second time range.

The receiver 3102 is configured to: receive a first-type frame sent by the first user equipment in the timeslot randomly selected from the first time range; and receive a second-type frame sent by the second user equipment in the timeslot randomly selected from the second time range.

Optionally, the first duration information includes duration of the first time range. The duration of the first time range is used by the first user equipment to determine an end time of the first time range according to a preset start time and the duration of the first time range, and determine the first time range according to the preset start time and the end time of the first time range.

Optionally, the second duration information includes duration of the second time range. The duration of the first time range is further used by the second user equipment to determine a start time of the second time range according to the duration of the first time range.

The duration of the second time range is used by the second user equipment to determine an end time of the second time range according to the start time of the second time range and the duration of the second time range, and determine the second time range according to the start time of the second time range and the end time of the second time range.

Optionally, the second duration information includes duration of the second time range.

The duration of the second time range is used by the second user equipment to determine an end time of the second time range according to the preset start time and the duration of the second time range, and determine the second time range according to the preset start time and the end time of the second time range.

Optionally, the broadcast frame further includes frame type indication information. The frame type indication information is used by the second user equipment to determine a frame type.

The receiver 3102 is specifically configured to receive the second-type frame that is corresponding to the frame type and sent by the second user equipment in the timeslot randomly selected from the second time range. Transmission duration of frames corresponding to different frame types is different.

Optionally, the broadcast frame further includes frame quantity indication information. The frame quantity indication information is used by the second user equipment to determine a frame quantity.

The receiver 3102 is specifically configured to receive the frame quantity of the second-type frames successively sent by the second user equipment in the timeslot randomly selected from the second time range.

Optionally, the broadcast frame further includes usage indication information of at least one channel. The usage indication information of the at least one channel is used by the second user equipment to determine whether the at least one channel is available, so that the second user equipment selects an available channel from the at least one channel.

The receiver 3102 is further specifically configured to receive the second-type frame sent by the second user equipment through the available channel in the timeslot randomly selected from the second time range.

Optionally, the receiver 3102 is further specifically configured to: if the available channel is a main channel, receive the second-type frame sent by the second user equipment through the available channel in the timeslot randomly selected from the second time range.

Optionally, the broadcast frame further includes duration information corresponding to each channel. The duration information corresponding to each channel is used by the second user equipment to determine a time range corresponding to each channel, so that if the available channel is a secondary channel, the second user equipment randomly selects a timeslot from a time range corresponding to the available channel.

The receiver 3102 is further configured to receive the second-type frame sent by the second user equipment through the available channel in the timeslot randomly selected from the time range corresponding to the available channel.

Optionally, the second duration information is specifically used by the second user equipment to determine the second time range, so that the second user equipment randomly selects a timeslot from the second time range, and randomly selects backoff duration in the randomly selected timeslot.

The receiver 3102 is specifically configured to receive the second-type frame sent by the second user equipment after the backoff duration in the timeslot randomly selected from the second time range.

Optionally, the backoff duration is determined by the second user equipment according to an access priority corresponding to the second user equipment. A higher access priority corresponding to the second user equipment indicates shorter backoff duration. A lower access priority corresponding to the second user equipment indicates longer backoff duration.

Optionally, a larger quantity of access failures of the second user equipment indicates a higher access priority corresponding to the second user equipment.

The network device provided in Embodiment 4 of this application may perform the information transmission method performed by the network device in either Embodiment 1 or Embodiment 2. A beneficial effect of Embodiment 3 is similar to those of the foregoing embodiments. Details are not described herein again.

Figure 32:
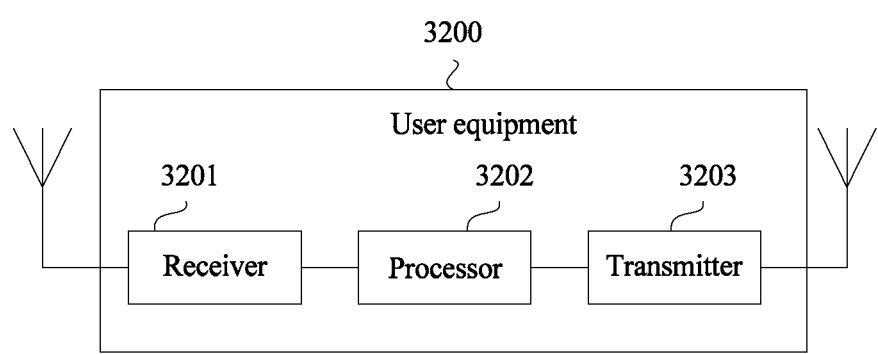
FIG. 32 is a schematic structural diagram of user equipment according to Embodiment 4 of this application.

Embodiment 4 of this application further provides user equipment 3200. FIG. 32 is a schematic structural diagram of the user equipment according to Embodiment 4 of this application. As shown in FIG. 32, the user equipment 3200 is second user equipment. The user equipment 3200 may include a receiver 3201, a processor 3202, and a transmitter 3203. The receiver 3201 is connected to the processor 3202. The processor 3202 is connected to the transmitter 3203.

The receiver 3201 is configured to receive a broadcast frame sent by a network device. The broadcast frame includes first duration information and second duration information that are of A-BFT. The first duration information is used by a first user equipment to determine a first time range, so that the first user equipment randomly selects a timeslot from the first time range, so as to send a first-type frame to the network device in the timeslot randomly selected from the first time range.

The processor 3202 is configured to determine a second time range according to the second duration information, and randomly select a timeslot from the second time range.

The transmitter 3203 is configured to send a second-type frame to the network device in the timeslot randomly selected from the second time range.

Optionally, the first duration information includes duration of the first time range, and the second duration information includes duration of the second time range.

The processor 3202 is specifically configured to: determine a start time of the second time range according to the duration of the first time range; determine an end time of the second time range according to the start time of the second time range and the duration of the second time range; and determine the second time range according to the start time of the second time range and the end time of the second time range.

Optionally, the second duration information includes duration of the second time range.

The processor 3202 is further specifically configured to: determine an end time of the second time range according to a preset start time and the duration of the second time range, where the preset start time is a preset start time of the first time range; and determine the second time range according to the preset start time and the end time of the second time range.

Optionally, the broadcast frame further includes frame type indication information.

The processor 3202 is further configured to determine a frame type according to the frame type indication information before the transmitter 3203 sends the second-type frame to the network device in the timeslot randomly selected from the second time range.

The transmitter 3203 is specifically configured to send, to the network device in the timeslot randomly selected from the second time range, the second-type frame corresponding to the frame type. Transmission duration of frames corresponding to different frame types is different.

Optionally, the broadcast frame further includes frame quantity indication information.

The processor 3202 is further configured to determine a quantity of to-be-sent frames according to the frame quantity indication information before the transmitter 3203 sends the second-type frame to the network device in the timeslot randomly selected from the second time range.

The transmitter 3203 is specifically configured to successively send the frame quantity of the second-type frames to the network device in the timeslot randomly selected from the second time range.

Optionally, the broadcast frame further includes usage indication information of at least one channel.

The processor 3202 is further configured to: determine, according to the usage indication information of the at least one channel, whether the at least one channel is available; and select an available channel from the at least one channel.

The transmitter 3203 is specifically configured to send the second-type frame to the network device through the available channel in the timeslot randomly selected from the second time range.

Optionally, the transmitter 3203 is specifically configured to: if the available channel is a main channel, send the second-type frame to the network device through the available channel in the timeslot randomly selected from the second time range.

Optionally, the broadcast frame further includes duration information corresponding to each channel.

The processor 3202 is further configured to: if the available channel is a secondary channel, determine, according to duration information corresponding to the available channel, a time range corresponding to the available channel; and randomly select a timeslot from the time range corresponding to the available channel.

The transmitter 3203 is further configured to send the second-type frame through the available channel in the timeslot randomly selected from the time range corresponding to the available channel.

Optionally, the processor 3202 is further configured to randomly select backoff duration in the timeslot randomly selected from the second time range before the transmitter 3203 sends the second-type frame to the network device in the timeslot randomly selected from the second time range.

The transmitter 3203 is specifically configured to send the second-type frame to the network device after the backoff duration in the timeslot randomly selected from the second time range.

Optionally, the processor 3202 is further configured to: before the transmitter 3203 sends the second-type frame to the network device in the timeslot randomly selected from the second time range, determine, according to an access priority of the second user equipment, backoff duration corresponding to the access priority. A higher access priority indicates shorter backoff duration. A lower access priority indicates longer backoff duration.

The transmitter 3203 is specifically configured to send the second-type frame to the network device after the backoff duration in the timeslot randomly selected from the second time range.

Optionally, the processor 3202 is further configured to determine the access priority according to a quantity of access failures of the second user equipment. A larger quantity of access failures indicates a higher access priority.

The user equipment provided in Embodiment 4 of this application may perform the information transmission method performed by the second user equipment in either Embodiment 1 or Embodiment 2. For a beneficial effect of Embodiment 4, refer to the foregoing embodiments. Details are not described herein again.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

What is claimed is:

1. A communication method, comprising:
sending a broadcast frame, the broadcast frame comprising first duration information and second duration information, wherein the first duration information is configured to indicate a first time range of association beamforming training (A-BFT) for a first user apparatus corresponding to the 802.11ad standard, a first timeslot being selected randomly from the first time range, wherein the second duration information is configured to indicate a second time range of A-BFT for a second user apparatus corresponding to the 802.11ay standard, a second timeslot being selected randomly from the second time range, wherein the first user apparatus and the second user apparatus correspond to different communications standards, wherein a duration of the second time range is equal to or greater than a duration of the first time range;

receiving a first-type frame from the first user apparatus in the first timeslot randomly selected from the first time range; and receiving a second-type frame from the second user apparatus in the second timeslot randomly selected from the second time range, a transmission duration of the first-type frame being equal to or greater than a transmission duration of the second-type frame.

2. The method according to claim 1, the second-type frame being a short sector sweep (SSSW) frame or sector sweep (SSW) frame.

3. The method according to claim 1, wherein the first duration information is located in an A-BFT length field of a beacon interval (BI) control field in the broadcast frame.

4. The method according to claim 1, wherein the broadcast frame further comprises frame quantity indication information, the frame quantity indication information being located in a frame of sector sweep (FSS) field of a beacon interval (BI) control field in the broadcast frame.

5. The method according to claim 4, wherein the frame quantity indication information is configured to indicate a frame quantity of the second-type frame, and the method further comprises:

receiving second-type frames with the indicated frame quantity of the second-type frame from the second user apparatus.

6. The method according to claim 5, wherein the frame quantity indication information is further configured to indicate a frame quantity of the first-type frame, and the method further comprises:

receiving first-type frames with the indicated frame quantity of the first-type frame from the first user apparatus.

7. A communication method, comprising:

receiving a broadcast frame from a network apparatus, the broadcast frame comprising first duration information and second duration information; wherein the first duration information is configured to indicate a first time range of association beamforming training (A-BFT) for a first user apparatus corresponding to the 802.11ad standard, a first timeslot being selected randomly from the first time range; wherein the second duration information is configured to indicate a second time range of A-BFT for a second user apparatus corresponding to the 802.11ay standard, a second timeslot being selected randomly from the second time range; wherein the first user apparatus and the second user apparatus correspond to different communications standards; and, wherein a duration of the second time range is equal to or greater than a duration of the first time range;

determining the second time range and randomly selecting the second timeslot from the second time range; and sending a second-type frame to the network apparatus in the second timeslot randomly selected from the second time range, a transmission duration of a first-type frame being equal to or greater than a transmission duration of the second-type frame.

8. The method according to claim 7, the second-type frame being a short sector sweep (SSSW) frame or sector sweep (SSW) frame.

9. The method according to claim 7, wherein the first duration information is located in an A-BFT length field of a beacon interval (BI) control field in the broadcast frame.

10. The method according to claim 7, wherein the broadcast frame further comprises frame quantity indication information, the frame quantity indication information being located in a frame of sector sweep (FSS) field of a beacon interval (BI) control field in the broadcast frame.

11. The method according to claim 10, wherein the frame quantity indication information is configured to indicate a frame quantity of the second-type frame, and the method further comprises:

sending second-type frames with the indicated frame quantity of the second-type frame to the network apparatus.

12. The method according to claim 11, wherein the frame quantity indication information is further configured to indicate a frame quantity of the first-type frame corresponding to the first user apparatus.

13. A non-transitory computer-readable storage medium storing a program product that, when executed, causes a computer to perform operations comprising:

receiving a broadcast frame from a network apparatus, the broadcast frame comprising first duration information and second duration information; wherein the first duration information is configured to indicate a first time range of association beamforming training (A-BFT) for a first user apparatus corresponding to the 802.11ad standard, a first timeslot being selected randomly from the first time range; wherein the second duration information is configured to indicate a second time range of A-BFT for a second user apparatus corresponding to the 802.11ay standard, a second timeslot being selected randomly from the second time range; wherein the first user apparatus and the second user apparatus correspond to different communications standards; and, wherein a duration of the second time range is equal to or greater than a duration of the first time range;

determining the second time range and randomly selecting the second timeslot from the second time range; and sending a second-type frame to the network apparatus in the second timeslot randomly selected from the second time range, a transmission duration of a first-type frame being equal to or greater than a transmission duration of the second-type frame.

14. The computer-readable storage medium according to claim 13, the second-type frame being a short sector sweep (SSSW) frame or sector sweep (SSW) frame.

15. The computer-readable storage medium according to claim 13, wherein the broadcast frame further comprises frame quantity indication information, the frame quantity indication information being located in a frame of sector sweep (FSS) field of a beacon interval (BI) control field in the broadcast frame.

16. The computer-readable storage medium according to claim 15, wherein the frame quantity indication information is configured to indicate a frame quantity of the second-type frame, the operations further comprising:

sending second-type frames with the indicated frame quantity of the second-type frame to the network apparatus.

17. The computer-readable storage medium according to claim 16, wherein the frame quantity indication information is further configured to indicate a frame quantity of the first-type frame corresponding to the first user apparatus.

* * * * *